US012147183B2

(12) United States Patent
Igarashi

(10) Patent No.: US 12,147,183 B2
(45) Date of Patent: Nov. 19, 2024

(54) PRINTING SYSTEM, WITH INSPECTION UNIT, DEFECTIVE PRINT DISCHARGE UNIT, AND NORMAL PRINT DISCHARGE UNIT, CONTROL METHOD THEREOF, AND STORAGE MEDIUM

(71) Applicant: CANON KABUSHIKI KAISHA, Tokyo (JP)

(72) Inventor: Hiroya Igarashi, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/183,231

(22) Filed: Mar. 14, 2023

(65) Prior Publication Data

US 2023/0333505 A1 Oct. 19, 2023

(30) Foreign Application Priority Data

Apr. 13, 2022 (JP) ................................ 2022-066106

(51) Int. Cl.
*G03G 15/00* (2006.01)

(52) U.S. Cl.
CPC ..... *G03G 15/5062* (2013.01); *G03G 15/5016* (2013.01); *G03G 15/6538* (2013.01); *G03G 15/6541* (2013.01); *G03G 15/6552* (2013.01); *G03G 15/6573* (2013.01)

(58) Field of Classification Search
CPC ........... G03G 15/5016; G03G 15/5062; G03G 15/6538; G03G 15/6541; G03G 15/6552; G03G 15/6573
See application file for complete search history.

(56) References Cited

U.S. PATENT DOCUMENTS 11,079,708 B2 * 8/2021 Shimono .................. B41J 29/38

FOREIGN PATENT DOCUMENTS

JP 2021133613 A 9/2021

* cited by examiner

*Primary Examiner* — Joseph S Wong
(74) *Attorney, Agent, or Firm* — ROSSI, KIMMS & McDOWELL LLP

(57) ABSTRACT

In a case of inspecting the presence/absence of a printing defect in a printed sheet for which print processing has been performed in a printing unit, the printing system discharges a printed sheet in which no printing defect is detected to a first discharge destination and discharges a printed sheet in which a printing defect is detected to a second discharge destination. In a case where a printing detect is detected in a printed sheet, the printing system also discharges the subsequent printed sheet to the second discharge destination after inspecting the subsequent printed sheet by an inspection unit.

10 Claims, 23 Drawing Sheets

| FIG.14B1 |
|---|
| FIG.14B2 |

FIG.14B1

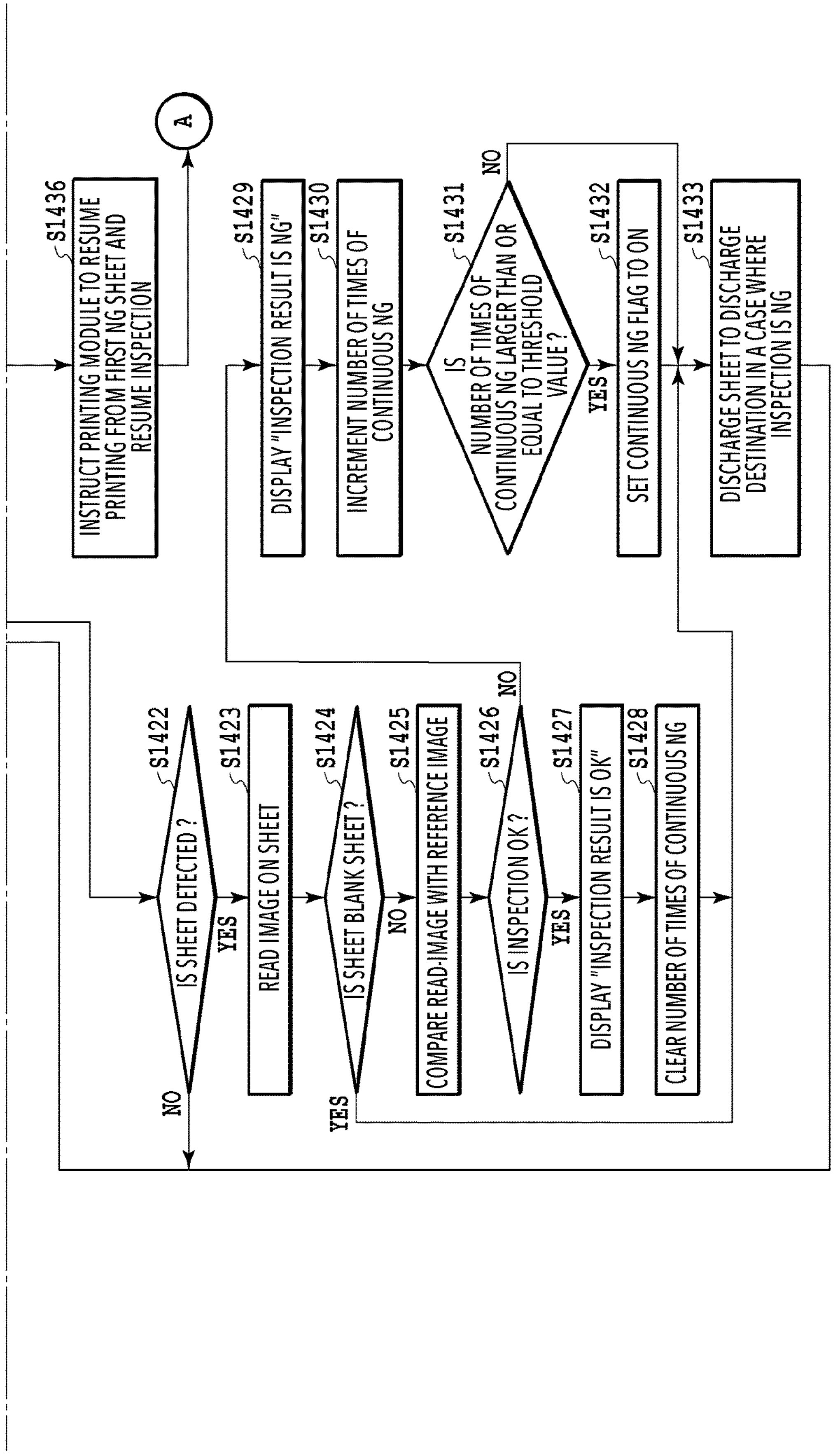
FIG.14B2

| FIG.19B1 |
| --- |
| FIG.19B2 |

FIG.19B1

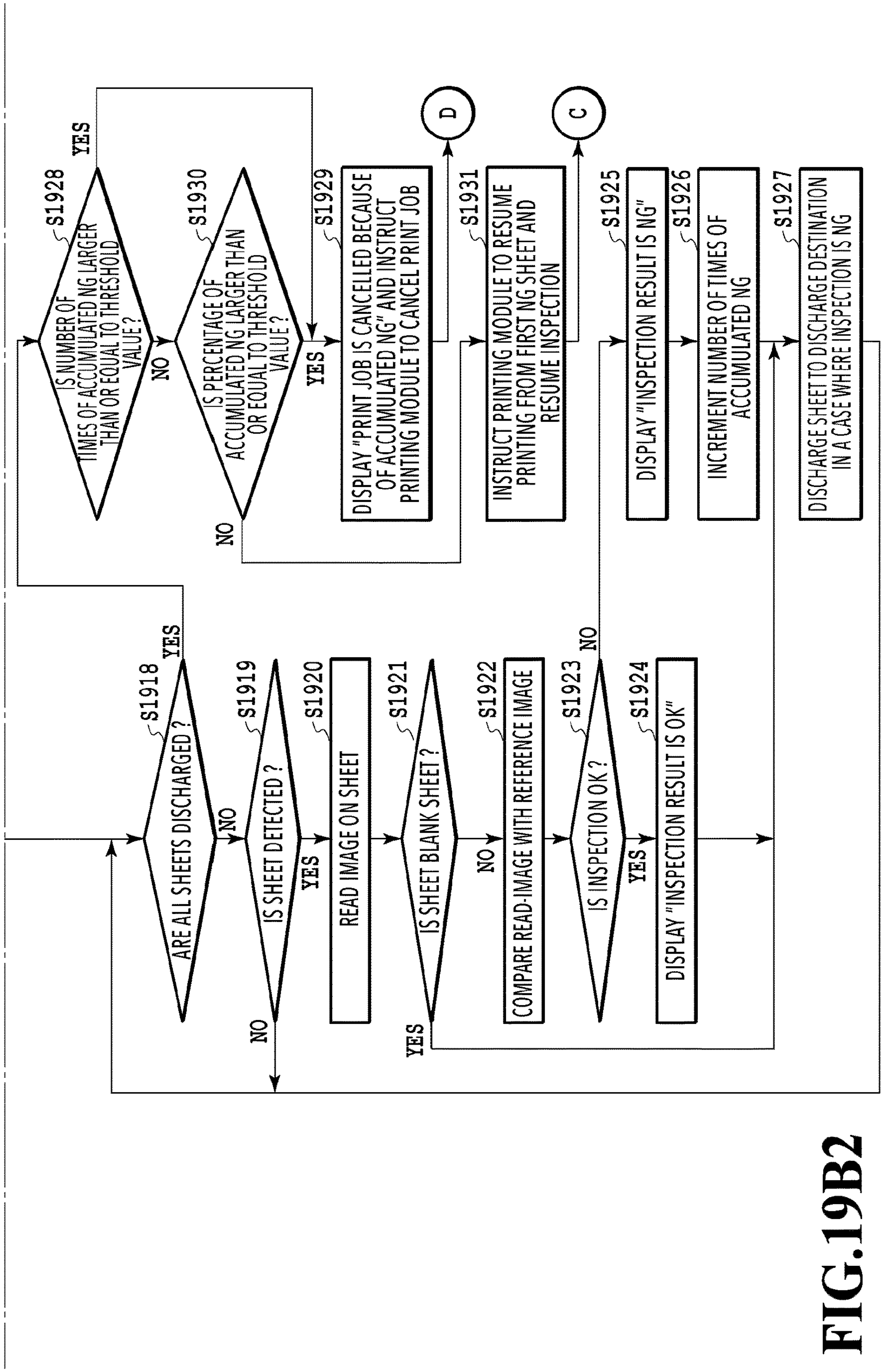
FIG.19B2

PRINTING SYSTEM, WITH INSPECTION UNIT, DEFECTIVE PRINT DISCHARGE UNIT, AND NORMAL PRINT DISCHARGE UNIT, CONTROL METHOD THEREOF, AND STORAGE MEDIUM

BACKGROUND OF THE INVENTION

Field of the Invention

The present disclosure relates to an inspection technique of a print result.

Description of the Related Art

Conventionally, there is a printing system that incorporates an inline inspection device capable of print output while inspecting a print result. In such a printing system, the presence/absence of a printing defect is determined by comparing an image used as an evaluation criterion (reference image) registered in advance for collation and an image (read-image) obtained by optically reading a printed material. In such a printing system, Japanese Patent Laid-Open No. 2021-133613 (hereinafter, referred to as Document 1) has disclosed a purge function to discharge a printed sheet determined to have a printing defect and a subsequent printed sheet onto a tray (escape tray) different from a tray onto which a printed sheet with no printing defect is discharged. Further, Document 1 has disclosed a configuration including a recovery function to resume printing from a page in a case where the page is determined to have a printing defect.

In Document 1, in a case where the printed sheet determined to have a printing defect in inspection and the subsequent printed sheet are discharged onto the escape tray (in a case where the purge function is in operation), the subsequent printed sheet is discharge without performing the inspection. Because of this, there occurs a problem in a case where there is stain in a reading unit of the inspection device or in a case where a reference image not corresponding to a pint job is erroneously set. That is, there is such a problem that a printed sheet that should be originally normal is determined to have a printing defect and discharged onto the escape tray despite the fact that no printing defect occurs actually.

The present invention has been made in order to solve the above-described problem and an object is to provide a printing system that reduces the number of wasted sheets that occur by a printed sheet that should be originally determined to be normal being erroneously determined to have a printing defect.

SUMMARY OF THE INVENTION

The printing system according to the present disclosure includes: a printing unit configured to perform print processing based on image data designated in a print job; an inspection unit configured to inspect the presence/absence of a printing defect in a printed sheet for which the print processing has been performed; a discharge unit configured to discharge the printed sheet in which no printing defect is detected in the inspection to a first discharge destination and discharge the printed sheet in which a printing defect is detected in the inspection to a second discharge destination; one or more memories that store instructions; and one or more processors that execute the instructions to: cause the inspection unit to inspect the printed sheet, which is conveyed from the printing unit, subsequent to the printed sheet in which the printing defect is detected in the inspection; and cause the discharge unit to discharge the subsequent printed sheet inspected by the inspection unit to the second discharge destination.

Further features of the present invention will become apparent from the following description of exemplary embodiments with reference to the attached drawings.

DESCRIPTION OF THE EMBODIMENTS

Figure 1:
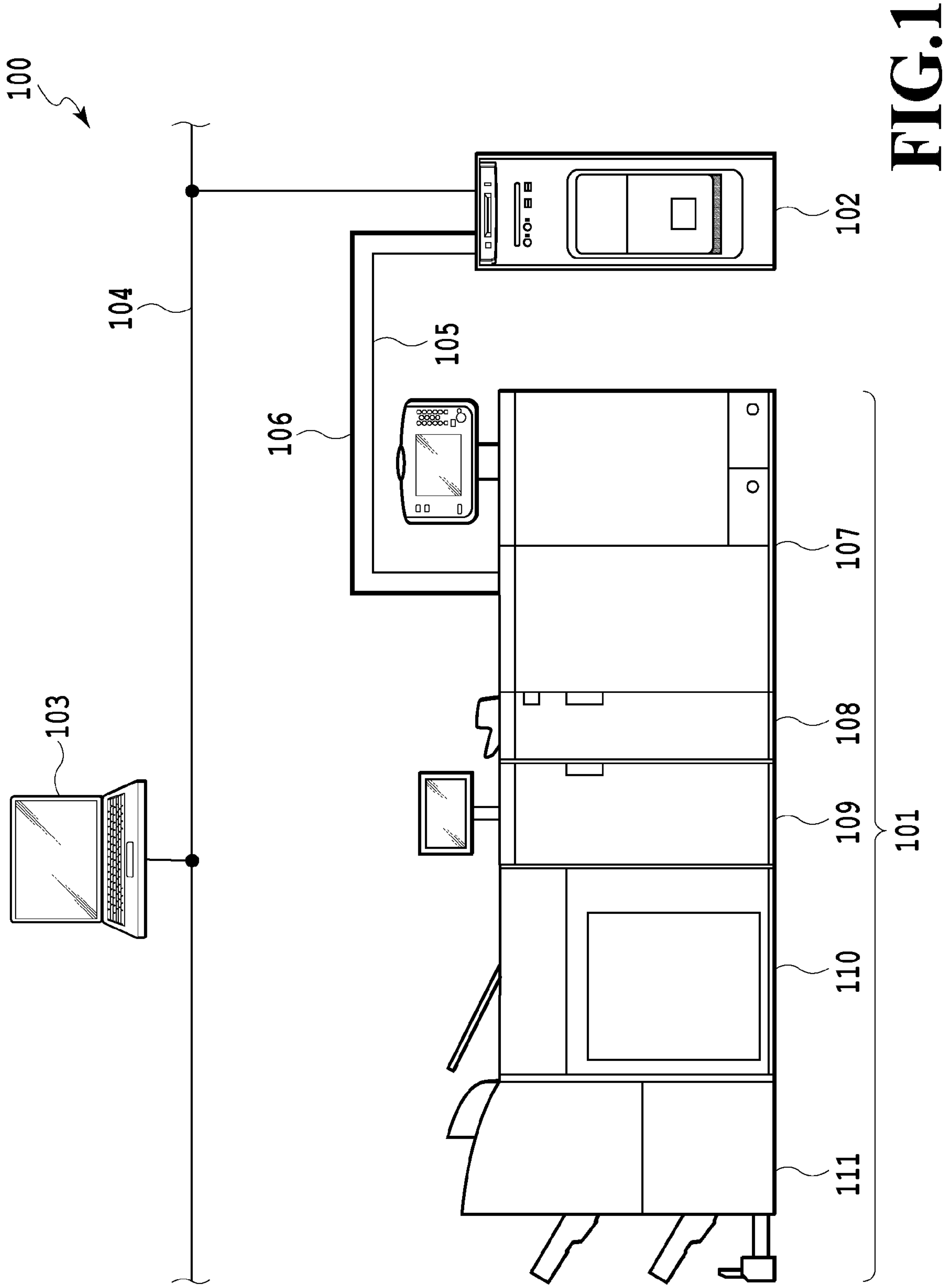
FIG. 1 is a diagram showing an example of a configuration of a printing system.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals.

First Embodiment

<System Configuration>

FIG. 1 is a diagram showing an example of the configuration of a printing system according to the present embodiment. A printing system 100 includes an image forming apparatus 101 and an external controller 102. The image forming apparatus 101 and the external controller 102 are connected so as to be capable of communication via an internal LAN 105 and a video cable 106. Further, the external controller 102 is connected with a client PC (client computer) 103 so as to be capable of communication via an external LAN 104.

In the client PC103, a printer driver is installed, which has a function to convert print processing target-image data into page description language (PDL) that the external controller 102 can process. It is possible for a user who desires to perform printing to give printing instructions via the printer driver from various applications. The printer driver transmits PDL data to the external controller 102 based on the printing instructions from the user. Upon receipt of PDL data from the PC 103, the external controller 102 generates print data that the image forming apparatus 101 can process by performing PDL analysis and rasterizing processing (hereinafter, this processing is called "print job") and inputs the print job to the image forming apparatus 101. The external controller 102 is sometimes called an image processing controller, a digital front end, a print server, a DFE and the like.

Next, the image forming apparatus 101 is explained. The image forming apparatus 101 includes a printing module 107, an inserter 108, an inspection module 109, a stacker 110, and a finisher 111. In the following, each module is explained.

The printing module 107 forms an image using toner as a printing material on a sheet as a printing medium, which is conveyed from a sheet feed unit 230, in accordance with the print job. The configuration and the operation principle of the printing module 107 are as follows. A laser beam modulated in accordance with an image designated in a print job is reflected by a rotating polygon mirror, such as a polygon mirror, and a photoconductor drum is irradiated with the laser beam as a scanning beam. An electrostatic latent image formed on the photoconductor drum by the laser beam is developed by toner and a toner image is transferred to a sheet on a transfer drum. By sequentially performing the series of image formation processes for the toner of each of yellow (Y), magenta (M), cyan (C), and black (K), a full-color image is formed on the sheet. The sheet on the transfer drum, on which the full-color image is formed, is conveyed to a fixing unit. The fixing unit includes a roller, a belt and the like, incorporates a heat source, such as a halogen heater, within the roller and melts the toner on the sheet on which the full-color image is formed by applying heat and pressure and fixes the toner onto the sheet.

The inserter 108 is a device that inserts a partitioning sheet or the like for separating a sheet group for which the print processing has been performed in the printing module 107 and which is conveyed at, for example, any position.

The inspection module 109 determines whether the image formed on the sheet is normal, that is, determines the presence/absence of a printing defect by reading the image on the printed sheet that is conveyed and comparing it with a reference image registered in advance.

The stacker 110 is a large-capacity stacking device capable of stacking printed sheets. The finisher 111 is a post-processing device having various finishing processing functions, such as stapling, punching, and saddle stitching bookbinding. The finisher 111 performs finishing processing that is selected and set in advance for the conveyed printed sheet. The sheet for which the finishing processing has been performed is discharged onto a sheet discharge tray.

The printing system explained in FIG. 1 has the configuration in which a print job is input via the external controller 102, but a configuration in which, for example, the external controller 102 is omitted may also be accepted. That is, the configuration in which the image forming apparatus 101 is connected to the external LAN 104 and PDL data is transmitted from the client PC 103 to the image forming apparatus 101, may also be possible. In this case, the print processing is performed after generating a print job by performing PDL analysis and rasterizing processing in the image forming apparatus 101. Further, in the example in FIG. 1, the external controller 102 and the image forming apparatus 101 are connected by the internal LAN 105 and the video cable 106, but the configuration is only required to be capable of transmission and reception of data necessary for printing. For example, the external controller 102 and the image forming apparatus 101 may be connected by only one of the internal LAN 105 and the video cable 106.

<Internal Configuration of Printing System>

Figure 2:
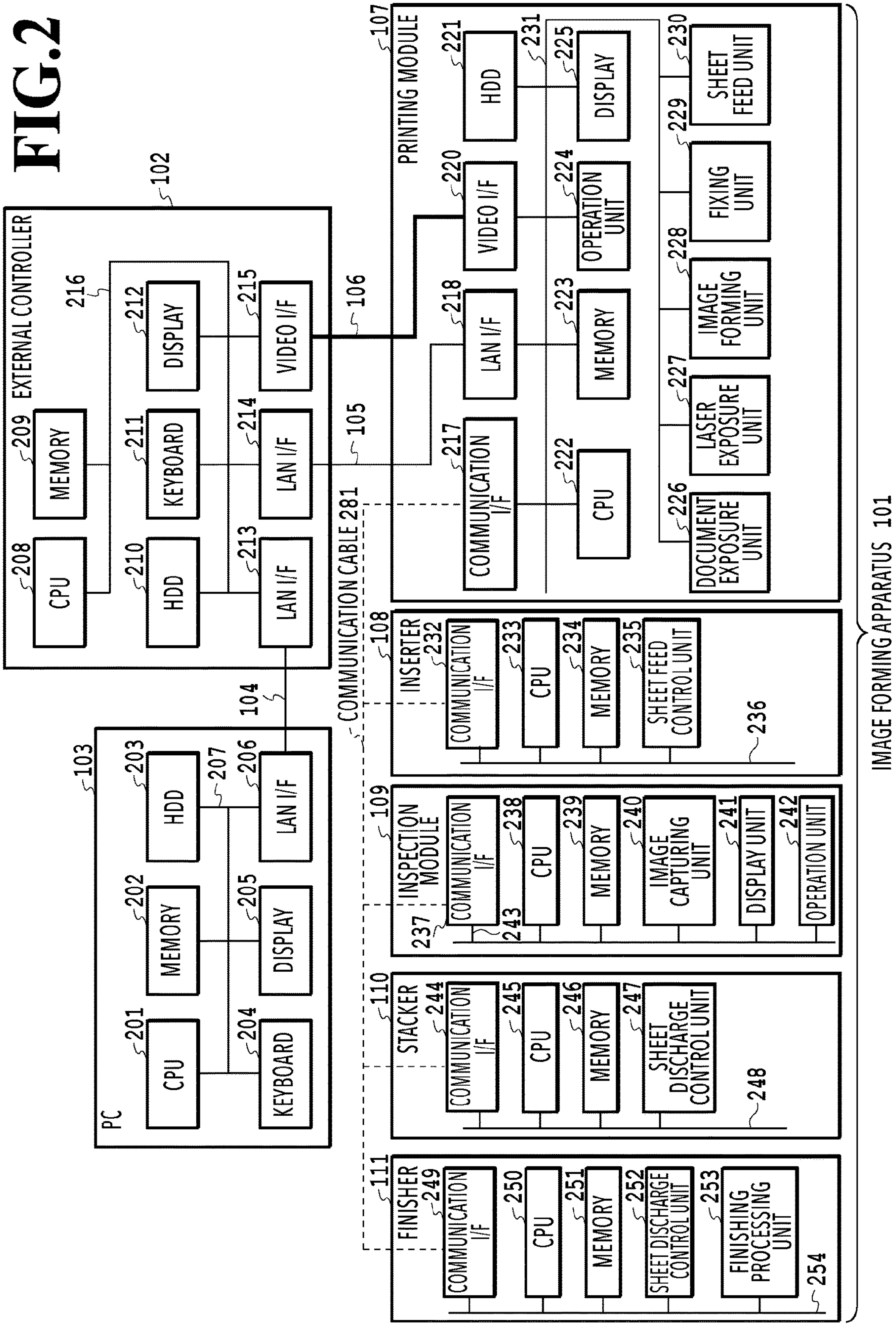
FIG. 2 is a block diagram showing an internal configuration of the printing system.

FIG. 2 is a block diagram showing the internal configuration of the image forming apparatus 101, the external controller 102, and the client PC 103, which are included in the printing system 100. In the following, explanation is given in order.

<<Internal Configuration of Image Forming Apparatus>>

First, the internal configuration of the printing module 107 of the image forming apparatus 101 is explained. The printing module 107 has, as components relating mainly to control, a communication I/F 217, a LAN I/F 218, a video I/F 220, an HDD 221, a CPU 222, a memory 223, an operation unit 224, and a display 225. Further, the printing module 107 has, as components relating mainly to image formation, a document reading unit 226, a laser exposure unit 227, an image forming unit 228, a fixing unit 229, and the sheet feed unit 230. Each component is connected via a system bus 231. The communication I/F 217 is connected with the inserter 108, the inspection module 109, the stacker 110, and the finisher 111 via a communication cable 281 and communication for controlling each device is performed. The LAN I/F 218 is connected with the external controller 102 via the internal LAN 105 and communication of print data and the like is performed. The video I/F 220 is connected with the external controller 102 via the video cable 106 and communication of image data and the like is performed. The HDD 221 is a storage device in which programs and data are stored. The CPU 222 controls the printing module 107 in an all-inclusive manner based on programs and the like stored in the HDD 221. The memory 223 stores programs and image data necessary at the time of the CPU 222 performing various kinds of processing, and operates as a work area. The operation unit 224 receives user inputs of various settings and operation instructions via, for example, a graphical user interface. The display 225 displays information on various settings relating to print processing, the processing status of the print job, and the like. The document reading unit 226 is a scanner device that optically reads a document at the time of using the copy function and the scan function. The document reading unit 226 optically reads an image on a document by capturing the image with a CCD camera while illuminating the sheet disposed by the user with an exposure lamp and generates image data. The laser exposure unit 227 is a device that performs primary charging and laser exposure for irradiation with a laser beam. The laser exposure unit 227 first performs primary charging that charges the photoconductor drum surface to a uniform minus potential. Next, the laser exposure unit 227 irradiates the photoconductor drum with the laser beam by a laser driver while adjusting the reflection angle with a polygon mirror. Due to this, the minus charges at the irradiated portion are neutralized and an electrostatic latent image is formed. The image forming unit 228 is a device for transferring toner onto the sheet. The image forming unit 228 includes a developing unit, a transfer unit, a toner replenishment unit and the like, which are not shown schematically, and transfers the toner on the photoconductor drum onto the sheet. The developing unit attaches the negatively charged toner from a development cylinder to the electrostatic latent image on the photoconductor drum surface and visualizes the electrostatic latent image. The transfer unit performs primary transfer that transfers the toner on the photoconductor drum surface onto a transfer belt by applying a plus potential to a primary transfer roller and secondary transfer that transfers the toner on the transfer belt onto the sheet by applying a plus potential to a secondary transfer roller. The fixing unit 229 is a device that melts and fixes the toner onto the sheet by applying heat and pressure and includes a heating heater, a fixing belt, a pressure belt and the like, which are not shown schematically. The sheet feed unit 230 is a device for feeding the sheet that is subjected to the print processing. The sheet feed unit 230 performs the sheet feed operation and the conveyance operation of the sheet by a roller and various sensors, which are not shown schematically.

Next, the internal configuration of the inserter 108 of the image forming apparatus 101 is explained. The inserter 108 includes a communication I/F 232, a CPU 233, a memory 234, and a sheet feed control unit 235 and each component is connected via a system bus 236. The communication I/F 232 is connected with the printing module 107 via the communication cable 281 and performs communication necessary for sheet insertion control. The CPU 233 controls the entire inserter 108 in accordance with control programs stored in the memory 234. The memory 234 is a storage device in which control programs are stored. The sheet feed control unit 235 controls taking in the sheet disposed on a tray 321, the sheet feed from a sheet feed unit, not shown schematically, and the conveyance of the sheet conveyed from the printing module 107 while controlling a roller and a sensor, which are not shown schematically, based on instructions from the CPU 233.

Next, the internal configuration of the inspection module 109 of the image forming apparatus 101 is explained. The inspection module 109 includes a communication I/F 237, a CPU 238, a memory 239, an image capturing unit 240, a display unit 241, and an operation unit 242 and each component is connected via a system bus 243. The communication I/F 237 is connected with the printing module 107 via the communication cable 281 and performs communication necessary for control, such as the inspection of a printed sheet. The CPU 238 controls the entire inspection module 109 in accordance with control programs stored in the memory 239. The memory 239 is a storage device that stores various kinds of setting information and image data, in addition to control programs. The image capturing unit 240 reads the image on the printed sheet that is conveyed by image capturing based on the instructions of the CPU 238. In the present embodiment, the image on the sheet is read by performing image capturing with a camera, but for example, it may also be possible to read the image with an inline scanner or the like. The CPU 238 compares the inspection-target captured image (inspection image) obtained by the image capturing unit 240 with the reference image stored in advance in the memory 239 and determines whether there is a defect in the print result. On the display unit 241, the inspection result, the setting screen and the like are displayed. The operation unit 242 is operated by the user via, for example, the graphical user interface and receives instructions to change the setting of the inspection module 109, to register the reference image, and so on.

Next, the internal configuration of the stacker 110 of the image forming apparatus 101 is explained. The stacker 110 includes a communication I/F 244, a CPU 245, a memory 246, and a sheet discharge control unit 247 and each component is connected via a system bus 248. The communication I/F 244 is connected with the printing module 107 via the communication cable 281 and performs communication necessary for sheet stacking and sheet discharge control. The CPU 245 controls the entire stacker 110 in accordance with control programs stored in the memory 246. The memory 246 is a storage device in which control programs are stored. The sheet discharge control unit 247 performs control for conveying a conveyed sheet to a stack tray, an escape tray, or the subsequent finisher 111 based on instructions from the CPU 245.

Next, the internal configuration of the finisher 111 of the image forming apparatus 101 is explained. The finisher 111 includes a communication I/F 249, a CPU 250, a memory, 251, a sheet discharge control unit 252, and a finishing processing unit 253 and each component is connected via a system bus 254. The communication I/F 249 is connected with the printing module 107 via the communication cable 281 and performs communication necessary for control of the finishing processing. The CPU 250 controls the entire finisher 111 in accordance with control programs stored in the memory 251. The memory 251 is a storage device in which control programs are stored. The sheet discharge control unit 252 controls sheet conveyance and sheet discharge based on instructions from the CPU 250. The finishing processing unit 253 performs processing, such as stapling, punching, and saddle stitching bookbinding, based on the instructions from the CPU 250.

<<Internal Configuration of External Controller>>

Next, the internal configuration of the external controller 102 is explained. The external controller 102 includes a CPU 208, a memory 209, an HDD 210, a keyboard 211, a display 212, a LAN I/F 213, a LAN I/F 214, and a video I/F 215 and each component is connected via a system bus 216. The CPU 208 performs processing, such as reception of PDL data from the client PC 103, RIP processing, and transmission of a print job to the image forming apparatus 101, based on programs and data stored in the HDD 210. The memory 209 stores programs and data necessary at the time of the CPU 208 performing various kinds of processing and operates as a work area. The HDD 210 stores programs and data necessary for operations, such as PDL analysis and RIP processing. The keyboard 211 is an input device for the user to input various operations and instructions to the external controller 102. On the display 212, information on an application being executed by the external controller 102, and the like is displayed in a still image or in a moving image. The LAN I/F 213 is connected with the client PC 103 via the external LAN 104 and reception of PDL data and the like are performed. The LAN I/F 214 is connected with the image forming apparatus 101 via the internal LAN 105 and transmission of a print job and the like are performed. The video I/F 215 is connected with the image forming apparatus 101 via the video cable 106 and transmission, reception and the like of image data are performed by the video I/F 215.

<<Internal Configuration of Client PC>>

Next, the internal configuration of the client PC 103 is explained. The client PC 103 includes a CPU 201, a memory 202, an HDD 203, a keyboard 204, a display 205, and a LAN I/F 206 and each component is connected via a system bus 207. The CPU 201 generates print processing target-image data and gives printing instructions based on a document generating program or the like stored in the HDD 203. Further, the CPU 201 comprehensively controls each device connected to the system bus 207. The memory 202 stores programs and data necessary at the time of the CPU 201 performing various kinds of processing and operates as a work area. The HDD 203 stores programs and data necessary for operations, such as the print processing. The keyboard 204 is an input device for the user to input various operations and instructions to the client PC 103. On the display 205, information on an application or the like, which is executed by the client PC 103, is displayed in a still image or in a moving image. The LAN I/F 206 is connected with the external LAN 104 and transmission and the like of PDL data are performed by the LAN I/F 206.

Each of the memory 202, the memory 209, the memory 223, the memory 234, the memory 239, the memory 246, and the memory 251 shown in FIG. 2 is only required to be a storage device for storing data and programs. For example, the configuration may be one in which those memories are replaced with a volatile RAM, a nonvolatile ROM, a built-in HDD, an external HDD, a USB memory or the like.

<Conveyance System of Image Forming Apparatus>

Figure 3:
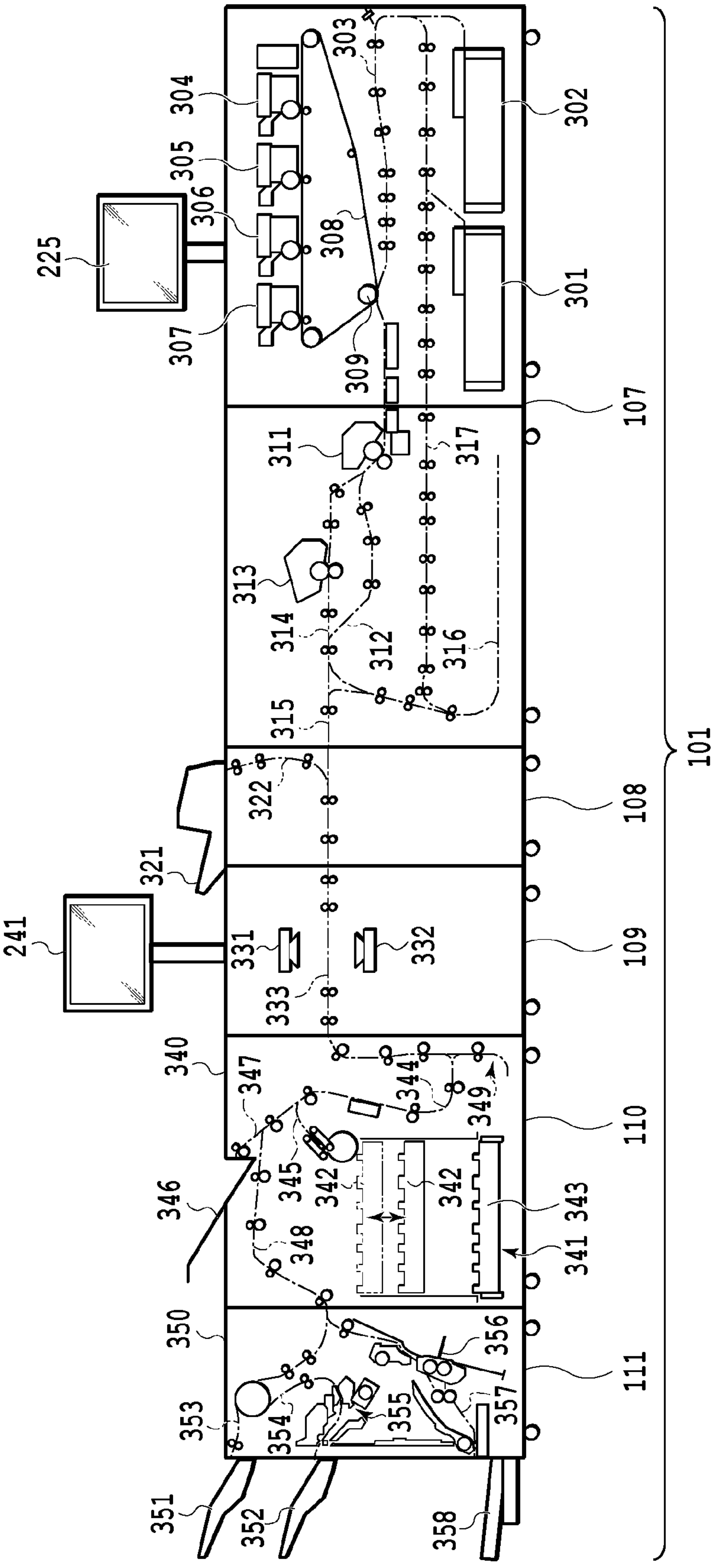
FIG. 3 is a cross-sectional diagram of a mechanism of an image forming apparatus.

Subsequently, the conveyance system of the image forming apparatus 101 is explained. FIG. 3 is a cross-sectional diagram of the mechanism of the image forming apparatus 101. In the following, explanation is given along FIG. 3.

The printing module 107 includes sheet feed decks 301 and 302. It is possible to store various sheets in each of the sheet feed decks 301 and 302. The sheet feed decks 301 and 302 separate only one sheet located at the uppermost position of the stored sheets and convey the sheet to a sheet conveyance path 303. Each of development stations 304 to 307 forms a toner image by using colored toner of Y, M, C, or K. The formed toner image is first transferred primarily onto an intermediate transfer belt 308. Then, the intermediate transfer belt 308 rotates clockwise in FIG. 3 and at a secondary transfer position 309, the toner image is transferred onto the sheet conveyed from the sheet conveyance path 303. On the display device 225, the processing status of a print job and information for various settings are displayed. A fixing unit 311 includes a pressure roller and a heating roller and fixes the toner image onto the sheet by causing the sheet to pass between each roller to melt and pressurize the toner. The sheet that exits the fixing unit 311 is conveyed to a sheet conveyance path 315 through a sheet conveyance path 312. In a case where the sheet is a sheet type that further requires the melt and the pressure to fix the toner image, after passing through the fixing unit 311, the sheet is conveyed to a second fixing unit 313 through a sheet conveyance path 312' located above the sheet conveyance path 312. The sheet for which the additional melt and pressure have been performed in the second fixing unit 313 is conveyed to the sheet conveyance path 315 through a sheet conveyance path 314. Here, in a case where the setting of the print mode is set to double-sided printing, the sheet is conveyed to a sheet reversing path 316 and then is conveyed to a double-sided conveyance path 317 after the sheet is reversed. Then, image transfer onto the second side is performed at the secondary transfer position 309.

In a case where the number of sheets that are conveyed to the inserter 108 through the sheet conveyance path 315 reaches a predetermined number of sheets, the inserter 108 merges a partition sheet fed through a sheet conveyance path 322 with the conveyance path. Due to this, it is possible to insert the partition sheet into a series of sheet groups conveyed from the printing module 107 at any timing and convey them to the subsequent device. The sheet having passed through the inserter 108 is conveyed to the inspection module 109. Within the inspection module 109, a first camera 331 and a second camera 332 are arranged so as to face each other. The first camera 331 captures the front side of the sheet and the second camera 332 captures the back side of the sheet. The inspection module 109 reads the images on both sides of the sheet by using the first camera 331 and the second camera 332 at the timing at which the sheet conveyed to a sheet conveyance path 333 reaches a predetermined position and inspects whether there is a defect in the read-image of the inspection-target side. On the display device 241, the result of the inspection performed by the inspection module 109, and the like are displayed. The inspected sheet is conveyed to the stacker 110.

The stacker 110 has a stack tray 341 for stacking sheets. The sheet having passed through the inspection module 109 is conveyed to the stacker 110 through a sheet conveyance path 344. The sheet conveyed via the sheet conveyance path 344 and a sheet conveyance path 345 is flipped and is stacked on the stack tray 341. The stacker tray 341 includes a lifting and lowering tray 342 and an eject tray 343. Further, the stacker 110 has an escape tray 346 as a sheet discharge tray. The escape tray 346 is a sheet discharge tray for discharging the sheet determined to have a printing defect (printing failure) by the inspection module 109. In a case where the sheet is discharged onto the escape tray 346, the sheet is conveyed to the escape tray 346 via the sheet conveyance path 344 and a sheet conveyance path 347. In a case where the sheet is conveyed to the finisher 111 in the subsequent stage of the stacker 110, the sheet is conveyed via a sheet conveyance path 348. A reversing unit 349 is used in a case where the discharge destination of the sheet is switched to another in accordance with the inspection result in the inspection module 109. The reason is to save time for reading images on the sheet with the first camera 331 and the second camera 332, inspecting the read-images, and switching the conveyance path to the sheet conveyance path 345 or 348. In a case where the inspection is not performed, the reversing unit 349 is used only in a case where the sheet is flipped at the time of stacking the sheet onto the stack tray 341. The sheet for which no printing failure has been detected as a result of the inspection by the inspection module 109 is conveyed to the finisher 111.

In the finisher 111, the finishing processing, such as stapling (one-portion/two-portion stapling), punching (two-hole/three-hole punching), and saddle stitching bookbinding, is performed for the conveyed sheet. The finisher 111 includes two sheet discharge trays 351 and 352. The sheet conveyed via a sheet conveyance path 353 is discharged onto the sheet discharge tray 351. However, it is not possible to perform the finishing processing, such as stapling, in the sheet conveyance path 353. In a case where the finishing processing, such as stapling, is performed, the sheet is conveyed to a first processing mechanism 355 via a sheet conveyance path 354. Then, after the finishing function designated by the user is performed in the first processing mechanism 355, the sheet is discharged onto the sheet discharge tray 352. It is possible for each of the sheet discharge trays 351 and 352 to lift and lower. Further, it is also possible to lower the discharge tray 351 and stack the sheet, which is applied to the finishing processing in the first processing mechanism 355, on the discharge tray 351. Further, in a case where the saddle stitch bookbinding is designated among the finishing functions, the second processing mechanism 356 staples the center of the sheets, folds the sheets in half, and discharges the sheets on the saddle stitch bookbinding tray 358 via the sheet conveyance path 357. The saddle stitch bookbinding tray 358 has a belt conveyor configuration and the sheet bundle (saddle stitch bookbinding bundle) stacked on the saddle stitch bookbinding tray 358 is conveyed to the left side.

<Details of Inspection Module>

Subsequently, the method of using the inspection module 109 such as various kinds of setting work in which the user should perform for the inspection module 109 before starting the inspection processing, is explained in detail. The inspection module 109 inspects a conveyed printed sheet in accordance with inspection items set in advance. The inspection is performed by comparing the read-image (hereinafter, called "inspection image") corresponding to the inspection-target side of the read-images on both sides of the sheet obtained by capturing the printed sheet with the reference image registered in advance in association with the sheet side indicating one of the obverse side and the reverse side. As the image comparison method, there are a method of comparing the pixel values for each corresponding position in both images, a method of comparing the object positions by edge detection, a method of comparing a recognition result by character recognition processing (OCR processing), and the like. In the following, with reference to various UI screens shown in FIG. 4 to FIG. 10, the preparation and setting that are performed in the inspection module 109 in advance are explained.

Figure 4:
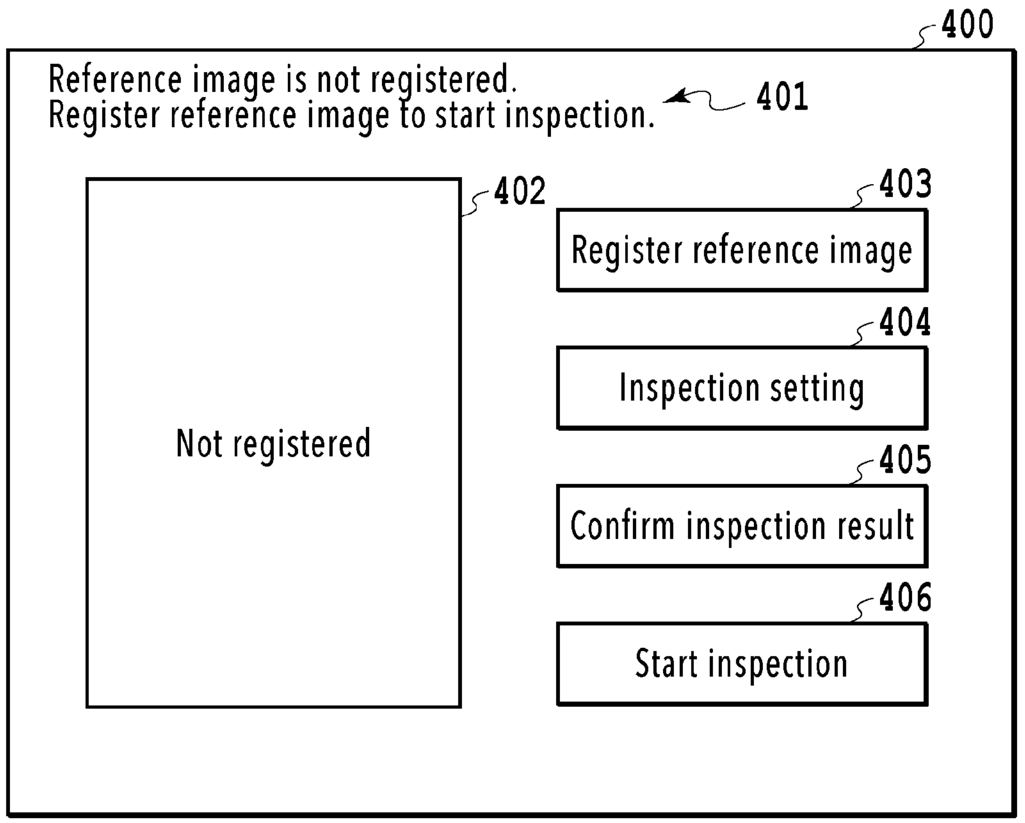
FIG. 4 is a diagram showing an example of an inspection menu screen of an inspection module.

FIG. 4 is an example of an inspection menu screen that is displayed on the display unit 241 of the inspection module 109 at the time of activation of the inspection module 109. The display control of various UI screens including this inspection menu screen is performed by the CPU 238 of the inspection module 109.

On an inspection menu screen 400 shown in FIG. 4, in a message field 401 located at the top left, a message that the reference image is not registered yet and a message that registration of the reference image is necessary prior to the start of the inspection processing are displayed. In a case where the reference image has already been registered at the point in time of activation, a message that it is possible to start the inspection processing is displayed. An image display area 402 in which the reference image is displayed is located under the message field 401. In the example in FIG. 4, the reference image is not registered yet, and therefore, a character string of "Not registered" is displayed. Four buttons 403 to 406 are arranged on the right side on the inspection menu screen 400.

The button 403 is a button for displaying an image registration screen, which is a UI screen for performing registration of the reference image. The reference image is an image that is used as a criterion at the time of determining whether there is a defect in an inspection image. In the present embodiment, the printed sheet determined in advance to be one normally printed by visual inspection and the like is read with the image capturing unit 240 based on user instructions and the obtained read-image is used as the reference image.

The button 404 is a button for displaying an inspection condition setting screen, which is a UI screen for setting conditions for inspection. The user sets an inspection item and an inspection accuracy in accordance with the purpose of inspection. Here, as the inspection items, there are shift in printing position, hue of image, density of image, streak and thin spot, print omission and the like. Further, the inspection accuracy is an index to determine the magnitude of the difference from the reference image, by which it is determined that there is a defect, and is specified by a numerical value, for example, such as within 1%.

The button 405 is a button for displaying an inspection result confirmation screen, which is a UI screen for confirming the inspection result. It is possible for the user to confirm the past inspection contents and the inspection result on the inspection result confirmation screen.

The button 406 is a button for giving instructions to start inspection. In a case where depressing the button 406 is detected, the inspection module 109 starts inspection of a printed sheet that is conveyed sequentially.

The configuration of the inspection menu screen 400 shown in FIG. 4 is merely exemplary and the configuration is not limited to this. It may also be possible to arrange a button within the inspection menu screen 400, which relates to the inspection information setting to display and set information relating to an inspection not described above, for example, information such as a partition sheet setting to separate a conveyed sheet group at any position. Following the above, the respective UI screens that are displayed after the respective buttons 403 to 405 for displaying the above-described three UI screens are depressed and the operations thereof are explained.

<<Registration of Reference Image>>

Figure 5:
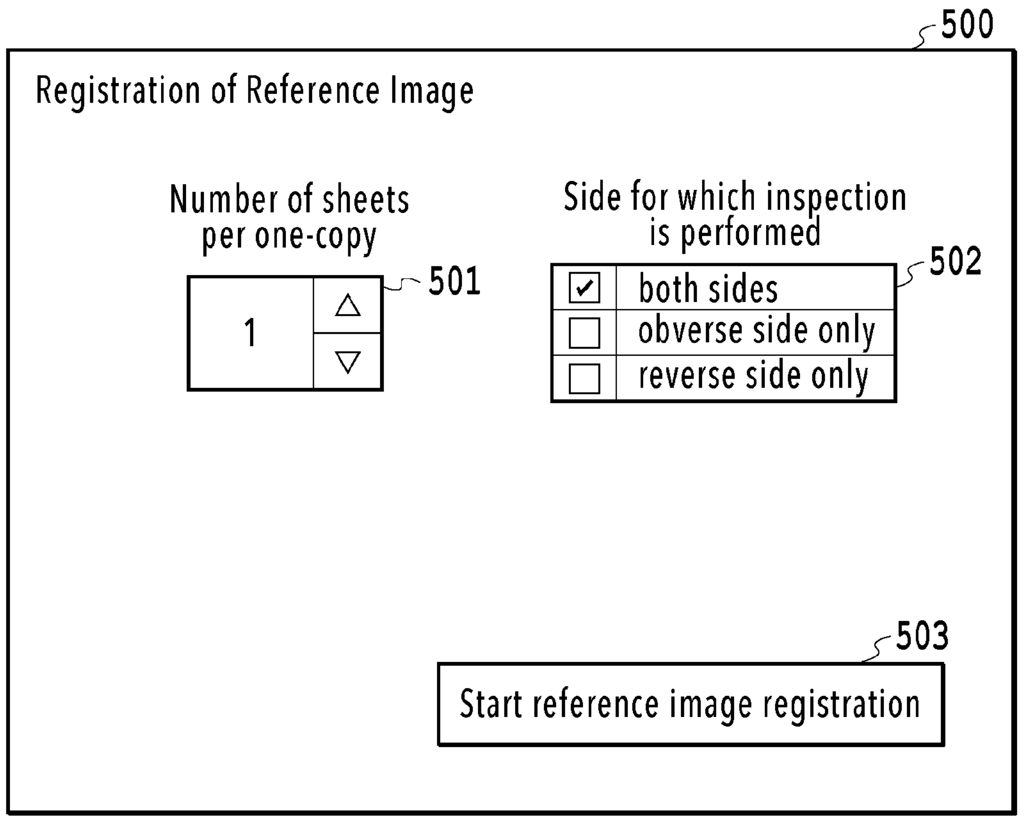
FIG. 5 is a diagram showing an example of an image registration screen of the inspection module.
Figure 6:
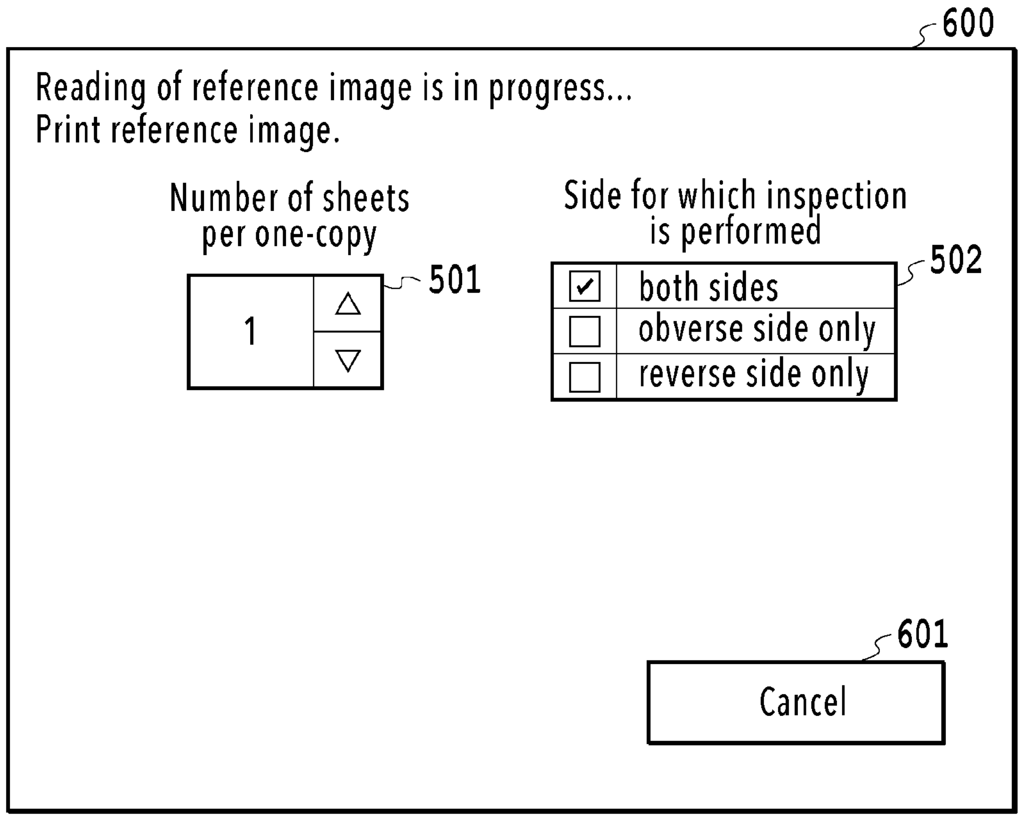
FIG. 6 is a diagram showing an example of a reading-in-progress screen of the inspection module.

On the above-described inspection menu screen 400, in a case where the user depresses the button 403, an image registration screen shown in FIG. 5, which is a UI screen for registering the reference image, is displayed on the display unit 241. On an image registration screen 500 shown in FIG. 5, two setting areas 501 and 502 and one button 503 exist. The setting area 501 is an area for setting the number of sheets per one-copy of printed material of the print job accompanied by inspection. It is possible for the user to designate the number of sheets per one-copy of printed material by operating a spin button within the setting area 501. In a case where two or more sheets are designated per copy of printed material, that is, in a case where a printed material whose one-copy includes a plurality of sheets is inspected, it is possible to register the reference image for each sheet.

The setting area 502 is an area for setting the inspection-target side of the sheet. It is possible to set to perform inspection for both sides of the sheet or only for one side (at this time, whether to perform inspection for the obverse side or for the reverse side is designated). Even in a case where printing is performed only for one side, it is possible to set the inspection condition so that the inspection of both sides is performed in order to inspect that there is no dust attached to the side that is not printed.

The button 503 is a button for starting the processing to read an image from a sample sheet and register it as the reference image. After setting the above-described two setting areas 501 and 502, the user depresses the button 503. In a case where the button 503 is depressed, first, the screen makes a transition from the image registration screen 500 into a reading-in-progress screen 600 indicating a standby situation for image reading. Then, both sides of the printed sheet, which is conveyed after the button 503 is depressed and which is used as a sample, are read by the image capturing unit 240. Based on the setting contents in the above-described setting area 502. the reference image is registered in association with information on the sheet side indicating one of the obverse side and the reverse side.

It is assumed that at the time of registration of the reference image, the apparatus configuration is such that the front side of the sheet that is read by the first camera 331 is "obverse side" and the back side of the sheet that is read by the second camera 232 is "reverse side". That is, it is assumed that the apparatus configuration is designed so that it is specified to dispose the sample sheet on the tray 321 of the inserter 108 with a specific orientation, for example, "document face up" and the front side of the sheet is the obverse side without exception at the time of the sheet passing through the inspection module 109.

However, instead of designing the fixed apparatus configuration such as the above configuration, it is also possible to register the read-image of the front side of the sheet that is read by the first camera 331 as the reference image of the "reverse side" by setting.

In either case, the reference image is registered in association with the sheet side. The display of the above-described reading-in-progress screen 600 continues until the image reading in accordance with the setting contents of the setting areas 501 and 502 is completed.

A button 601 within the reading-in-progress screen 600 is a button for cancelling image reading. In a case where the button 601 is depressed, the image reading operation is cancelled and the UI scree of the display unit 241 makes a transition into the inspection menu screen 400 described above.

Figure 7:
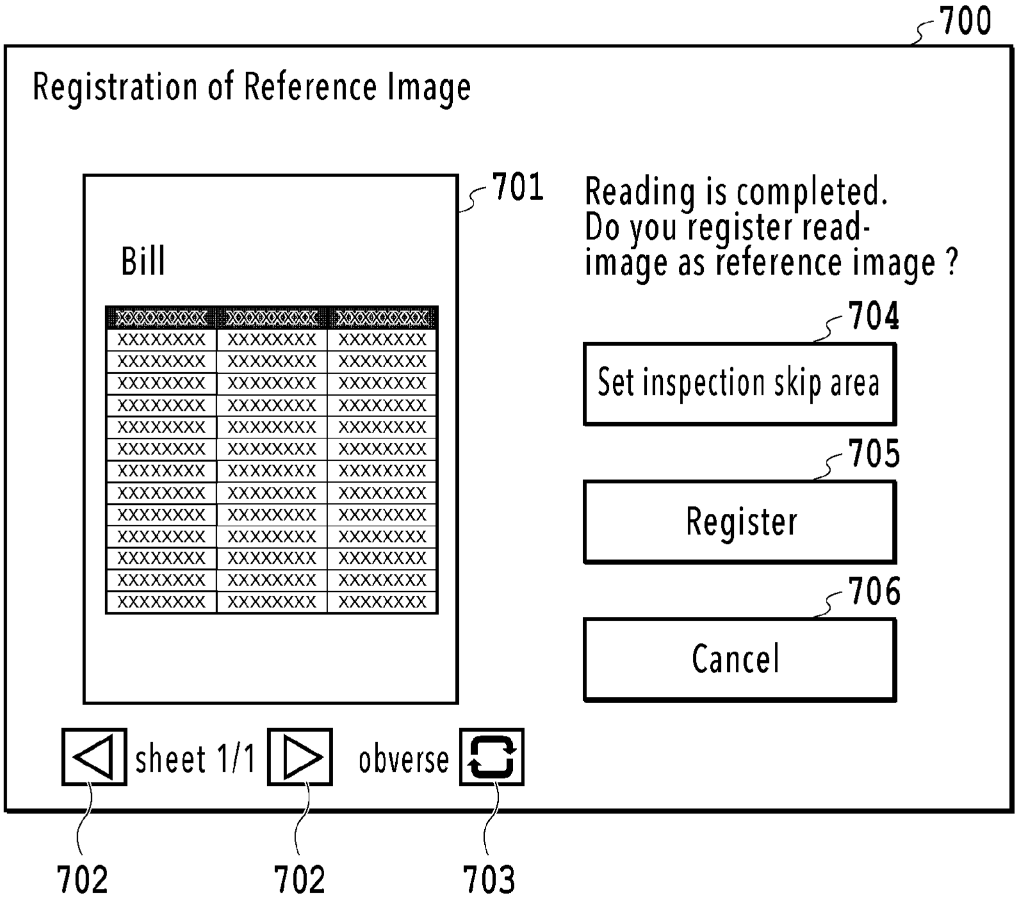
FIG. 7 is a diagram showing an example of a registration processing screen of the inspection module.

In a case where image reading of sheets corresponding to the set number of sheets is completed, the UI screen of the display unit 241 makes a transition from the reading-in-progress screen 600 into a registration processing screen 700 shown in FIG. 7, which is a UI screen prompting registration of the reference image and setting of related items.

An image display area 701 in which a read image is displayed is arranged on the left side of the registration processing screen 700. Further, buttons 702 for switching sheets to be displayed in a case where one-copy consists of a plurality of sheets and a button 703 for switching displays between the obverse side and the reverse side of the sheet are arranged under the image display area 701.

In a case where the number of sheets per one-copy of printed material is one, which is set on the image registration screen 500, it may also be possible not to display the buttons 702. Similarly, in a case where the inspection target-side that is set on the image registration screen 500 is only one side, it may also be possible not to display the button 703.

Three buttons 704 to 706 are arranged on the right side of the registration processing screen 700.

The button 704 is a button for setting an area of the reference image (hereinafter, called "inspection skip area") for which a comparison with the inspection image is not performed. The inspection skip area setting is used in a case where the inspection-target area is limited. For example, a case of Variable Data Printing (VDP) in which print contents are changed for a specific area within the sheet for each copy of printed material is considered. That is, a case where printing is performed by attaching a different ID for each copy of printed material and changing only the portions of the address and the name for each copy is considered.

Figure 8:
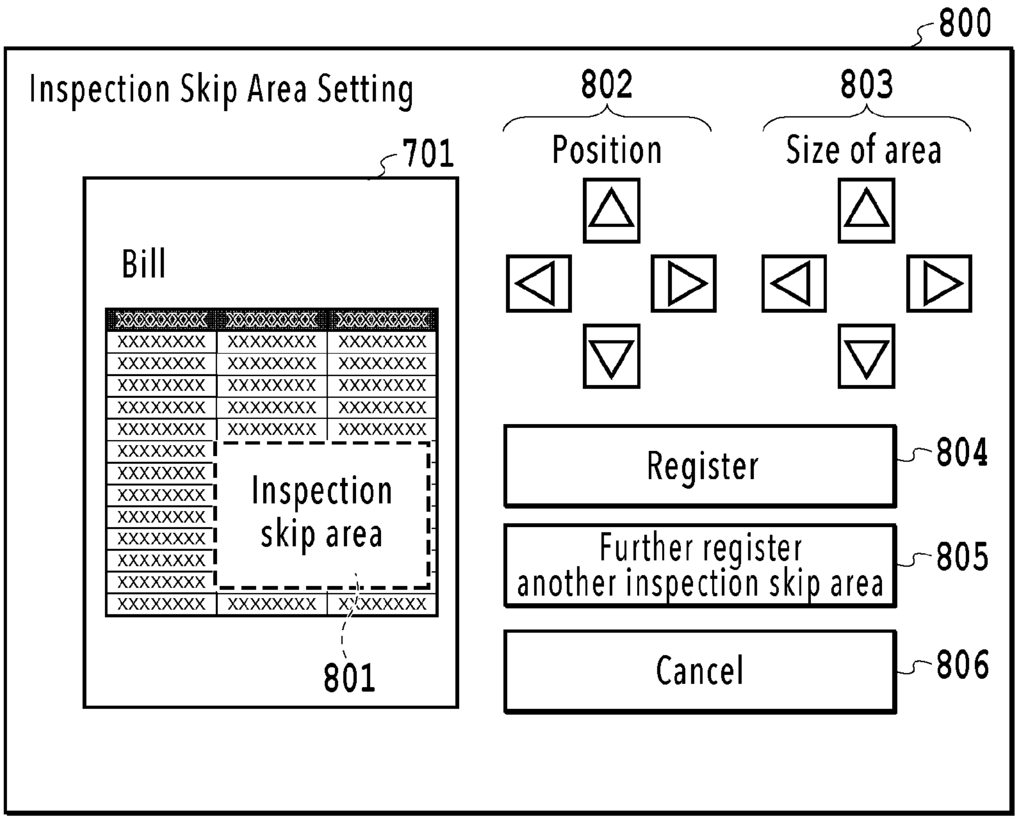
FIG. 8 is a diagram showing an example of an area setting screen of the inspection module.

In a case where the button 704 is depressed, the UI screen makes a transition from the registration processing screen 700 into an area setting screen shown in FIG. 8, which is an inspection skip area setting UI screen. On an area setting screen 800 shown in FIG. 8, a broken-line rectangle within the image display area 701 indicates an inspection skip area 801.

It is possible for the user to change the position of the inspection skip area 801 by using a position change button 802 and change the size of the inspection skip area 801 by using a size change button 803. The user who determines the position and size of the inspection skip area 801 depresses a button 804 in order to register the inspection skip area 801. In a case where the button 804 is depressed, the set inspection skip area 801 is registered in association with the reference image being displayed in the image display area 701. After the registration of the inspection skip area is completed, the UI screen of the display unit 241 makes a transition into the registration processing screen 700.

A button 805 is a button for further registering another inspection skip area for the same reference image after registering the inspection skip area 801, which is one of the inspection skip areas.

A button 806 is a button for cancelling the setting of the inspection skip area. In a case where the button 806 is depressed, the setting of the inspection skip area is cancelled and the UI screen of the display unit 241 makes a transition into the registration processing screen 700.

Explanation is returned to the registration processing screen 700. The button 705 is a button for registering the read-image being displayed in the image display area 701 as the reference image. In a case where the button 705 is depressed, the read-image displayed in the image display area 701 is registered as the reference image in association with the relevant sheet number (for example, first sheet/ten sheets) and the sheet side (obverse side or reverse side). After the registration is completed, the UI screen of the display unit 241 makes a transition from the registration processing screen 700 into the inspection menu screen 400.

The button 706 is a button for cancelling the registration of the reference image. In a case where the button 706 is depressed, the registration processing is cancelled and the UI screen of the display unit 241 makes a transition into the inspection menu screen 400.

<<Setting of Inspection Conditions>>

Figure 9:
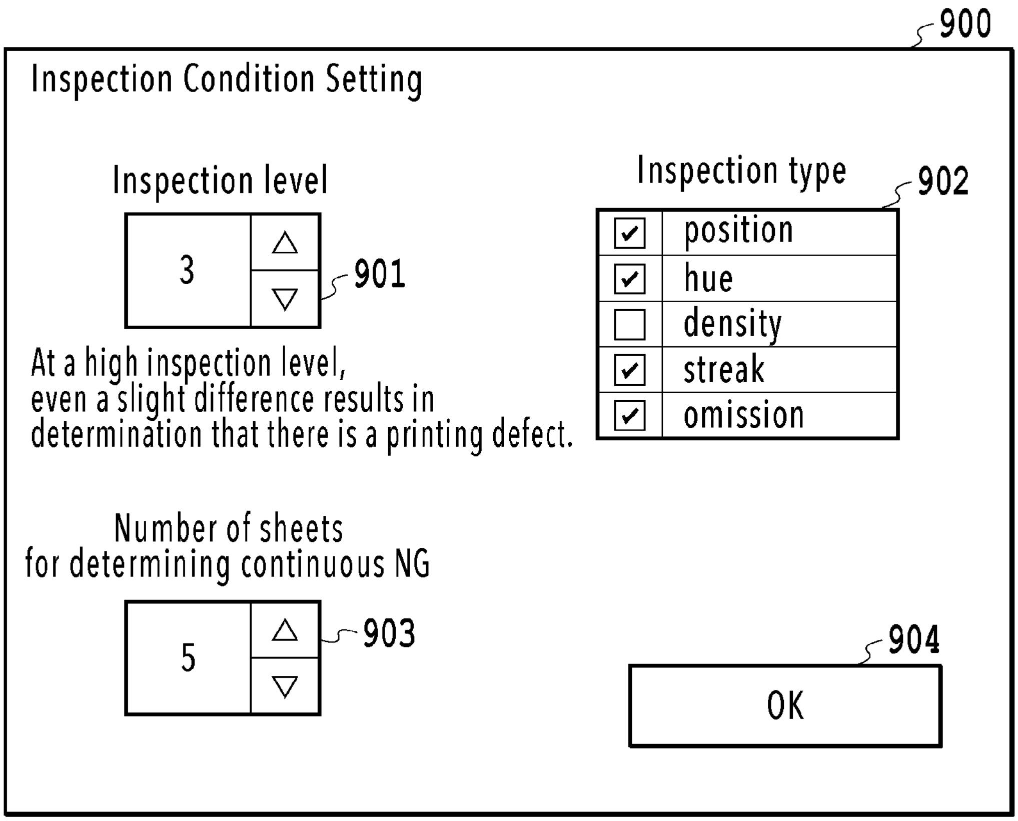
FIG. 9 is a diagram showing an example of an inspection condition setting screen of the inspection module.

In a case where the user depresses the button 404 on the above-described inspection menu screen 400, an inspection condition setting screen 900 for setting inspection conditions by the operation of the user shown in FIG. 9 is displayed on the UI screen of the display unit 241. Three setting areas 901, 902, and 903 and an OK button 904 are arranged on the inspection condition setting screen 900.

The setting area 901 is an area for setting a detection level of a defect at the time of performing inspection. It is possible for the user to set a desired inspection level by operating a spin button within the setting area 901. Here, a case where the inspection level is set high (numerical value is set large) is considered. Even in a case where a small difference exists between the reference image and the inspection image, the inspection image is determined to have a printing defect.

The setting area 902 is an area for setting an inspection type. It is possible for the user to select the viewpoint from which inspection is performed in accordance with the inspection purpose with a checkbox. In the example in FIG. 9, five items are prepared, that is, position, hue, density, streak, and omission and the four items of position, hue, streak, and omission are confirmed. In this case, position, hue, streak, and omission are taken as the target of inspection, but density is not taken as the target of inspection.

The setting area 903 is an area for setting a threshold value of continuous inspection NG by which the print job is cancelled in a case where inspection NG occurs continuously in the inspection processing. It is possible to set a value larger than or equal to "0" as the threshold value. In a case where the threshold value is set to "0", the operation is the same as the operation in which the inspection module 109 does not perform the inspection processing, and therefore, here, a case where the threshold is set to a value larger than or equal to 1, is considered. In a case where the printed sheet is determined to be inspection NG in the inspection processing, inspection is performed for the subsequent printed sheet and the printed sheet is discharged onto the escape tray. In a case where the number of times in which inspection NG occurs continuously is larger than or equal to the above-described threshold value in the inspection for the printed sheet or in the inspection for the subsequent printed sheet, the print job is cancelled.

In a case where the OK button 904 is depressed, the setting of the inspection conditions is completed and the UI screen of the display unit 241 makes a transition into the inspection menu screen 400.

<<Confirmation of Inspection Result>>

Figure 10:
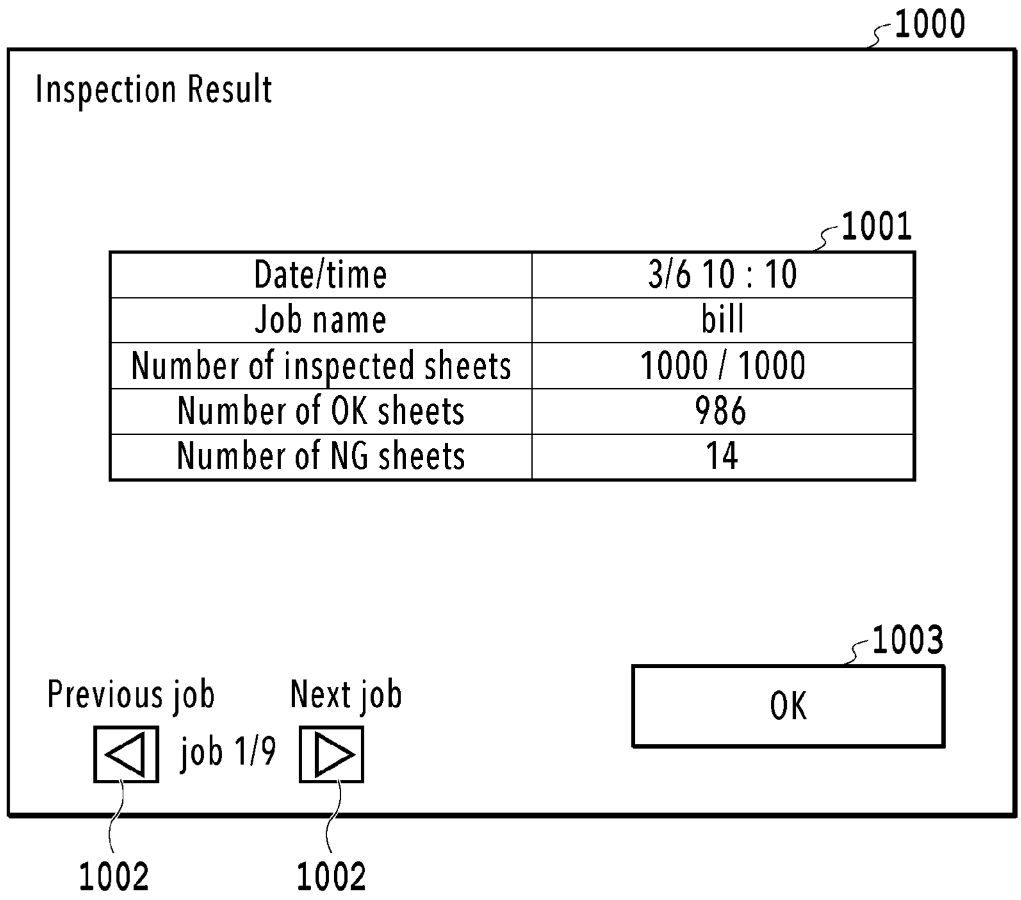
FIG. 10 is a diagram showing an example of an inspection result confirmation screen of the inspection module.

In a case where the user depresses the button 405 on the above-described inspection menu screen 400, an inspection result confirmation screen for confirming the inspection result, which is shown in FIG. 10, is displayed on the display unit 241. On an inspection result confirmation screen 1000, a result display area 1001 in which details of the inspection result are displayed, buttons 1002 for switching display-target print jobs, and an OK button 1003 are arranged. In the example of the result display area 1001 shown in FIG. 10, among nine print jobs whose history is stored, the inspection result of the first job is shown. That is, each piece of information on the date and time of execution of the inspection of the first job, the name of the target print job, the number of sheets for which the inspection has been performed, and the number of inspection OK sheets and the number of inspection NG sheets among the sheets for which the inspection has been performed, is displayed. Then, it is possible for the user to switch the display-target print jobs by operating the buttons 1002 that are displayed by the left and right spin buttons. In a case where the user who has confirmed the inspection result depresses the OK button 1003, the UI screen of the display unit 241 makes a transition into the inspection menu screen 400.

<Details of External Controller>

Figure 11:
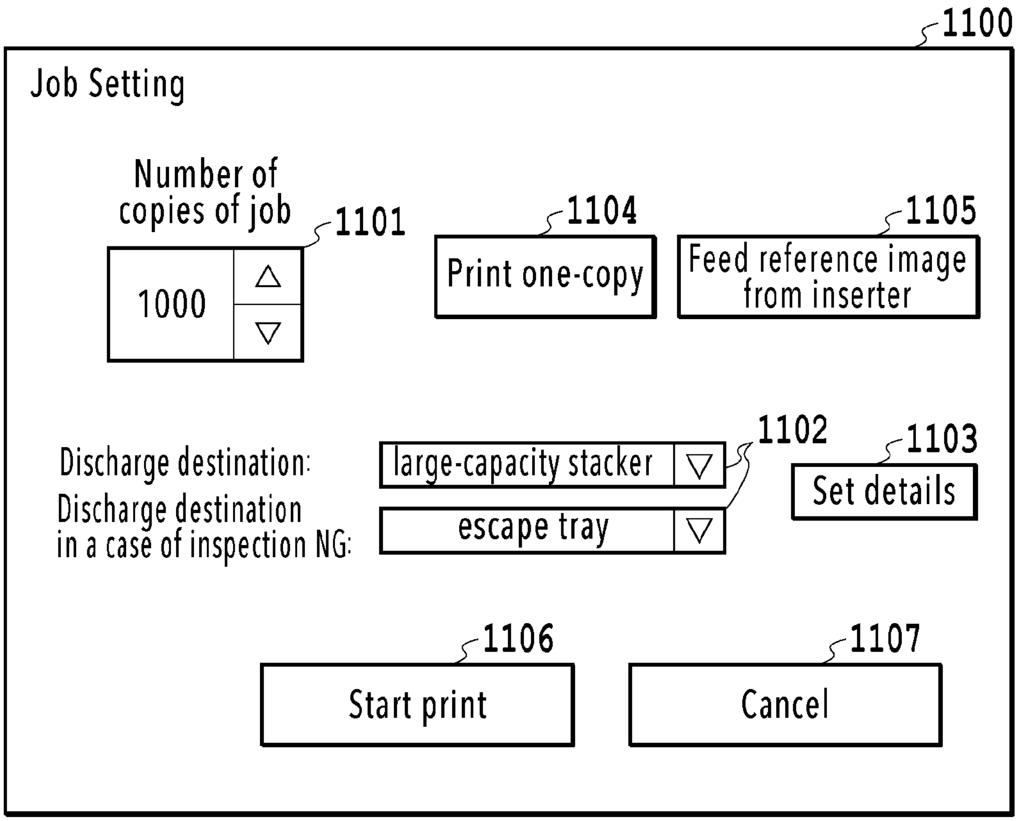
FIG. 11 is a diagram showing an example of a job setting screen of the inspection module.

Following the above, the method of using the external controller 102 is explained in detail. The user who has performed the above-described various settings for the inspection module 109 generates a job (hereinafter, called "registration job") for which the reference image is registered and the print job by using the external controller 102 and inputs the generated jobs to the image forming apparatus 101. A setting screen on which various settings of the registration job and the pint job are performed is displayed on the display 212 of the external controller 102. FIG. 11 is an example of a job setting screen for setting the operation conditions of the image forming apparatus 101. The display control of this job setting screen is performed by the CPU 208 within the external controller 102. Two setting areas 1101 and 1102 and five buttons 1103 to 1107 are arranged on a job setting screen 1100 shown in FIG. 11.

The setting area 1101 is an area for setting the number of copies in the print job. It is possible for the user to set a desired number of copies by operating spin buttons within the setting area 1101. In the example in FIG. 11, the print job designating printing of 1,000 copies is generated.

The setting area 1102 is an area for setting the discharge destination of a printed sheet printed in accordance with the registration job and the print job. In the example shown in FIG. 11, as the discharge destination of the printed sheet determined to have no printing defect, that is, a printed sheet determined to be inspection OK, the stack tray 341 within the stacker 110 is selected. As the discharge destination of a printed sheet determined to have a printing defect, that is, the printed sheet determined to be inspection NG, the escape tray 346 within the stacker 110 is selected.

In a case of performing the print job immediately after the registration of a reference image, it is possible for the user to confirm the print result immediately by setting the discharge destination of the printed sheet to the escape tray 346. Further, at the time of printing a large number of copies, it is also possible for the user to set the discharge destination of the printed sheet to the stacker 110. That is, it is possible for a use to select the discharge destination of the printed sheet in accordance with the use. Further, it may also be possible for the user to set the discharge destination of the printed sheet determined to be inspection OK and the discharge destination of the printed sheet determined to be inspection NG from a plurality of discharge destinations.

The button 1103 is a button for setting in detail the print conditions other than the setting of the discharge destination. In a case where the user depresses the button 1103 for performing the detailed setting, a popup screen (not shown schematically) is displayed. It is possible for the user to perform various settings, such as the imposition setting, the print quality setting, the finishing setting, and the discharge side setting. Here, the imposition setting is a setting to designate, for example, both-sided printing, 2in1 printing and the like. The print quality setting is a setting to designate, for example, which of quality priority and processing speed priority is given to at the time of printing. The finishing setting is a setting to designate the contents of the post-processing, such as stapling and hole-punching. The discharge side setting is a setting to designate which of faceup (the obverse side facing upward) and facedown (obverse side facing down) discharge is performed with for the selected discharge destination.

The two buttons 1104 and 1105 arranged side by side on the top right on the job setting screen 1100 are buttons that are used at the time of registering the reference image in the registration job.

First, the button 1104 on the left side is used in a case where a sample sheet is printed, and then the image on the printed sheet is read and registered as the reference image, that is, in a case where the "registration job" is performed. In a case where the user depresses the button 1104, the printing module 107 performs printing of one-copy of sheet, and the inspection module 109 reads the image on the printed sheet and the registration job to perform registration of the read-image is generated. The registration job is input to the image forming apparatus 101. Then, the reference image is registered by performing a series of processing in accordance with the registration job, in the image forming apparatus 101.

Further, the button 1105 on the right side is used in a case where the sample sheet for which the print processing is completed is fed from the inserter 108 and the inspection module 109 reads the sheet and registers the read-image as the reference image. In a case where the button 1105 on the right side is used, the print processing is not performed and only the reading of the reference image and the processing of registration are performed.

Before depressing the button 1105, the user disposes the sample sheet on the tray 321 of the inserter 108. The sample sheet is conveyed from the inserter 108 to the inside of the inspection module 109, and the image on the sample sheet is read in the inspection module 109 and registered as the reference image. Here, it may be possible to feed the sample sheet from the sheet feed unit 230 of the printing module 107, but in such a case, the sample sheet passes through the fixing unit 311 and the second fixing unit 313, and therefore, there is a case where the image of the sample sheet deforms or degenerates due to the application of pressure and heat. Because of this, in a case where the registration of the reference image is performed by using the sample sheet for which the print processing has been performed, it is desirable to feed the sample sheet from the inserter 108. In the present embodiment, it is assumed that the user gives instructions to start registration of the reference image in the inspection module 109 (depresses the button 503 on the image registration screen 500 described above) prior to depressing the button 1104 or the button 1105.

The button 1106 located at the bottom on the screen is a button for giving instructions to start execution of the print job. In a case where the button 1106 is depressed, the external controller 102 generates the print job based on the contents of the setting performed on the job setting screen 1100 and inputs the print job to the printing module 107. In the present embodiment, it is assumed that the user gives instructions to start inspection by depressing the button 406 on the inspection menu screen 400 in the inspection module 109 prior to depressing the button 1106. In a case where a print job is input from the external controller 102, the print processing of the designated number of copies is performed in the printing module 107 and the sheets for which the print processing has been performed are conveyed sequentially to the inspection module 109 and the inspection is performed in accordance with the inspection conditions set in advance.

The button 1107 is a button for cancelling the setting work relating to the inspection and in a case where the user depresses the button 1107, the job setting screen 1100 is closed.

<Registration Processing of Reference Image>

Figure 12:
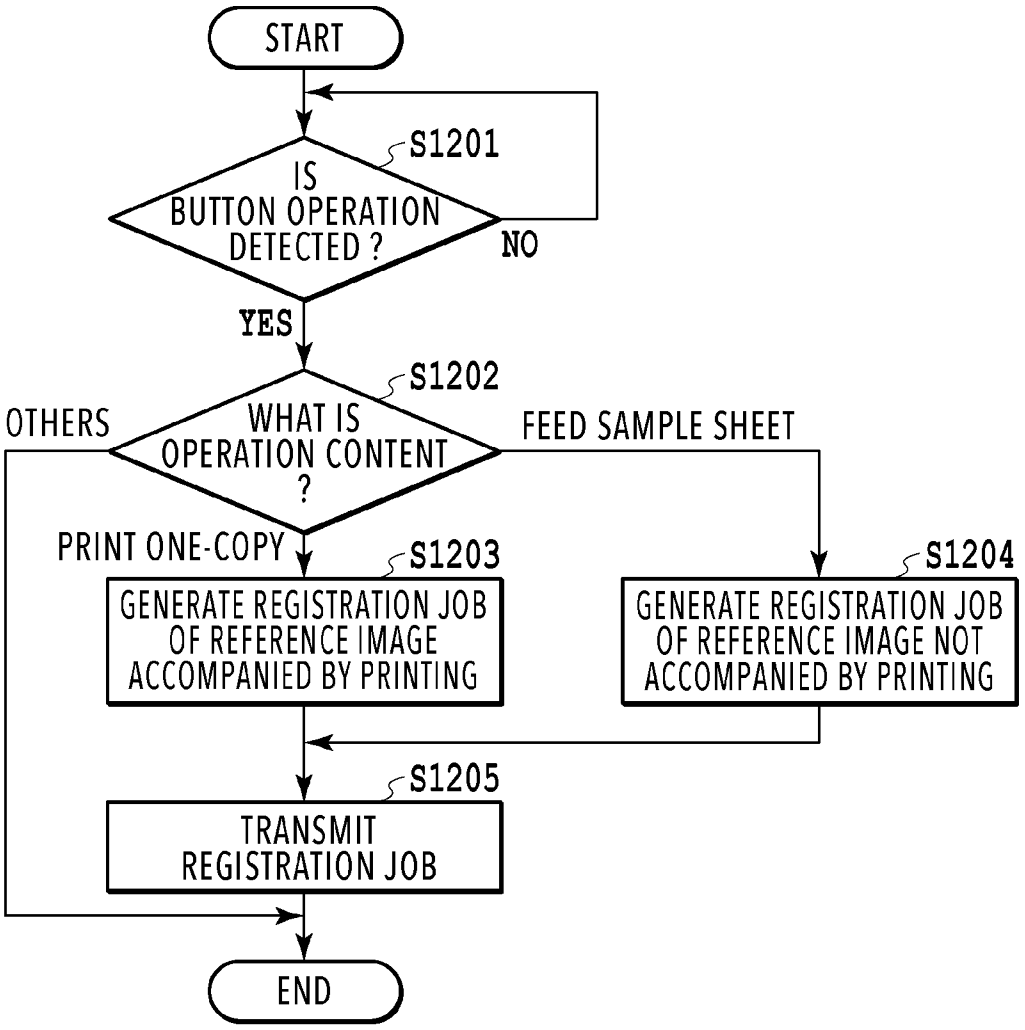
FIG. 12 is a flowchart showing a flow in a case where a registration job of a reference image is input.
Figure 13:
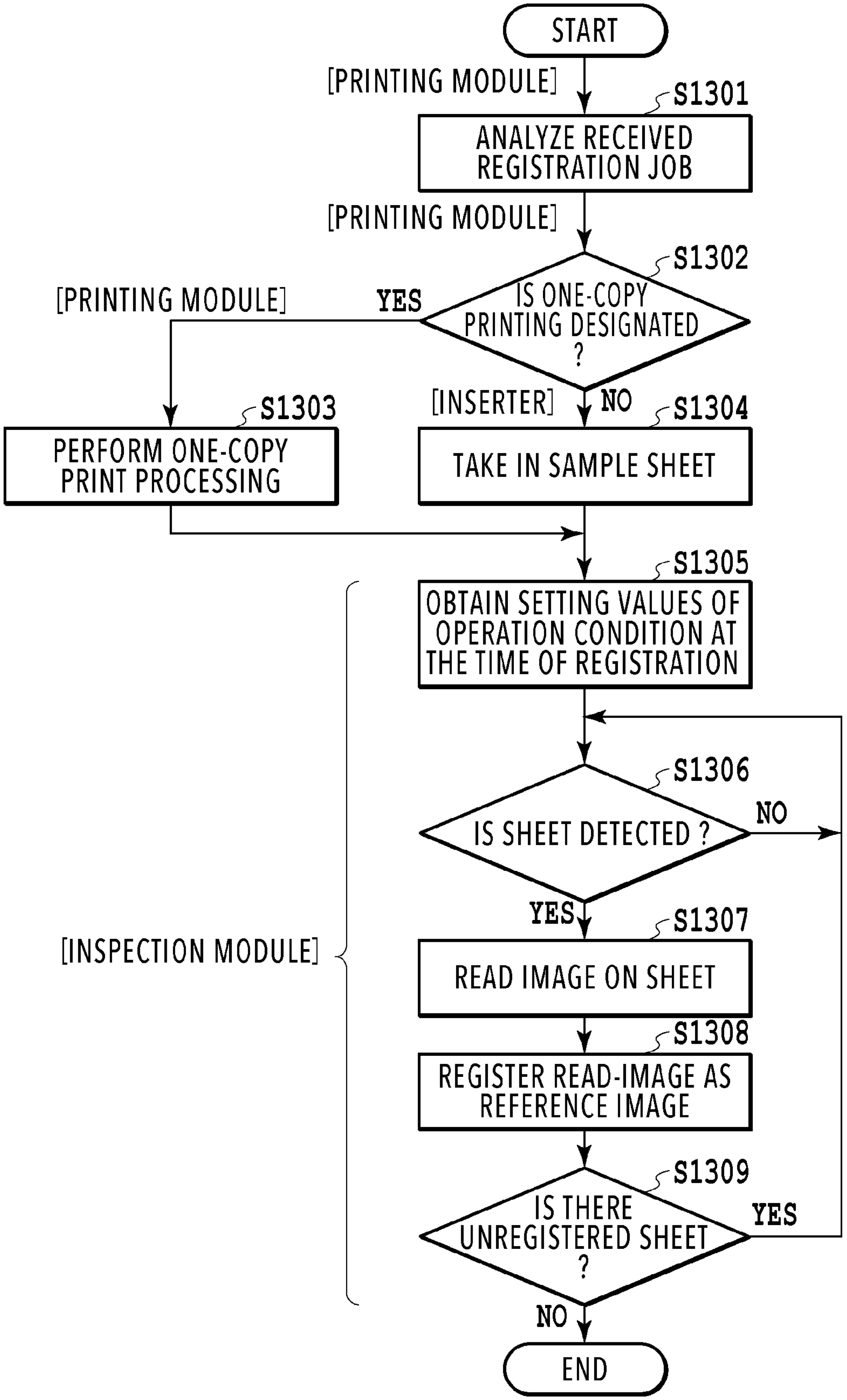
FIG. 13 is a flowchart showing a flow of processing to register a reference image in accordance with a registration job.

Following the above, a flow of specific processing at the time of registering the reference image is explained. FIG. 12 is a flowchart showing a flow of processing until the external controller 102 generates a predetermined registration job and inputs it to the image forming apparatus 101 in a case where the button 1104 or the button 1105 is depressed on the job setting screen 1100 described above. Then, FIG. 13 is a flowchart showing a flow of processing until the reference image is registered in accordance with the registration job input from the external controller 102 in the image forming apparatus 101. Symbol "S" in the flowcharts in FIG. 12 and FIG. 13 means a step.

<<Processing on Side of External Controller>>

Processing on the side of the external controller 102 at the time of registering the reference image is explained in the following.

S1201 in the flowchart shown in FIG. 12 is processing to monitor the button operation by the user on the job setting screen 1100 in displaying. In a case where the operation of one of buttons is detected, the processing advances to S1202.

At S1202, the processing is branched in accordance with the contents of the button operation. In a case where the detected button operation is depressing the button 1104 of "Print one-copy", the processing advances to S1203 and in a case where the detected button operation is depressing the button 1105 of "Feed reference image from inserter", the processing advances to S1204. In a case where the detected button operation is depressing a button other than the button 1104 and the button 1105, this processing is terminated.

At S1203, a registration job is generated, which gives instructions to perform the print processing of only one copy and then register the image obtained by reading the printed sheet as the reference image. In the registration job in this case, information on printing-target image data, the sheet feed source and the like is included.

On the other hand, at S1204, the registration job, which gives instructions to take in the sample sheet for which it has been confirmed that there is no printing failure from the inserter 108 and register an image obtained by reading the sample sheet as the reference image, is generated. Different from the registration job that is generated at S1203, the print processing is not accompanied, and therefore, the registration job in this case may not include information on image data, the sheet feed source and the like. However, in each of the registration job that is generated at S1203 and the registration job that is generated at S1204, contents of the discharge setting (that is, information on the discharge destination and discharge side) that are set on the job setting screen 1100 described previously are included.

At S1205, the registration job of the reference image generated at S1203 or S1204 is transmitted to the image forming apparatus 101 via the LAN I/F 214.

<<Processing on Side of Image Forming Apparatus>>

A flow of processing on the side of the image forming apparatus 101 at the time of the image forming apparatus 101 receiving a registration job transmitted from the external controller 102 is explained with reference to the flowchart in FIG. 13.

The series of processing shown in the flowchart in FIG. 13 starts by the printing module 107 of the image forming apparatus 101 receiving the registration job transmitted from the external controller 102.

First, at S1301, the CPU 222 of the printing module 107 analyzes the registration job received from the external controller 102. Then, the CPU 222 of the printing module 107 controls the inserter 108, the inspection module 109, the stacker 110, and the finisher 111 via the communication cable 281 in accordance with the contents of the received registration job. In response to a result of the job analysis, the control contents change depending on whether print processing of only one-copy is performed for reading the reference image or the sample sheet is used for reading the reference image. Further, at S1301, processing to notify the inspection module 109 of the information on the sheet discharge setting extracted from the registration job is also performed.

Then, at S1302, the processing is branched in accordance with the above-described determination result. Specifically, in a case where one-copy printing is designated in the registration job, the processing advances to S1303 and in a case where taking in the sample sheet is designated, the processing advances to S1304.

At S1303, the printing module 107 performs the print processing of only one-copy by using image data included in the registration job received at S1301. The sheet that is used for this print processing is supplied from the sheet feed source designated in the registration job. The printed sheet for which the print processing has been performed is conveyed to the inspection module 109.

At S1304, the inserter 108 takes in the sample sheet disposed on the tray 321 in accordance with instructions from the printing module 107. The taken-in sample sheet is conveyed to the inspection module 109. The processing at S1305 and subsequent steps is processing that is performed in the inspection module 109.

At S1305, the CPU 238 of the inspection module 109 obtains the setting values (that is, the number of sheets per one-copy and information specifying the inspection-target side) of the operation conditions at the time of registering the reference image, which are set by the user on the image registration screen 500. The obtained setting values are stored in the memory 239. It may also be possible to have performed S1305 in parallel to S1303 and S1304 after receiving the registration job at S1301.

Subsequently, S1306 is the detection processing of the sheet that is conveyed (the printed sheet for which the print processing has been performed in the printing module 107 or the sample sheet taken in by the inserter 108). In a case where the sheet is detected, the processing advances to S1307.

At S1307, first, the images on both sides of the conveyed sheet are read by the image capturing unit 240. Then, the obtained image data is displayed in the image display area 701 on the registration processing screen 700 described above as well as stored in the memory 239. The sheet for which the image reading has been completed is discharged to the discharge destination in accordance with the sheet discharge setting notified by the printing module 107. Then, in response to the button 705 within the registration processing screen 700 being depressed, the processing advances to S1308.

Then, at S1308, the image data corresponding to the inspection-target side among the image data read at S1307 and stored in the memory 239 is registered as the reference image and stored in the memory 239. At this time, with reference to the setting values obtained at S1305, information in which the image data indicates which sheet side of what number sheet corresponding to the reference image, for example, such as "obverse side of the first sheet", is also registered together with the image data. In the present embodiment, as described above, the front side of the sheet read by the first camera 331 is the obverse side and the back side of the sheet read by the second camera 332 is the reverse side.

At S1309, the CPU 238 of the inspection module 109 determines whether or not the image reading processing and the reference image registration processing for the number of sheets specified by the setting value obtained at S1305 are complete. In a case where there is an unregistered sheet, the processing returns to S1306 and the processing for the next sheet is continued. On the other hand, in a case where the reference image registration processing is completed for all the sheets, the loop processing at S1306 to S1309 is finished.

<Print Processing Accompanied by Inspection>

Figure 14A:
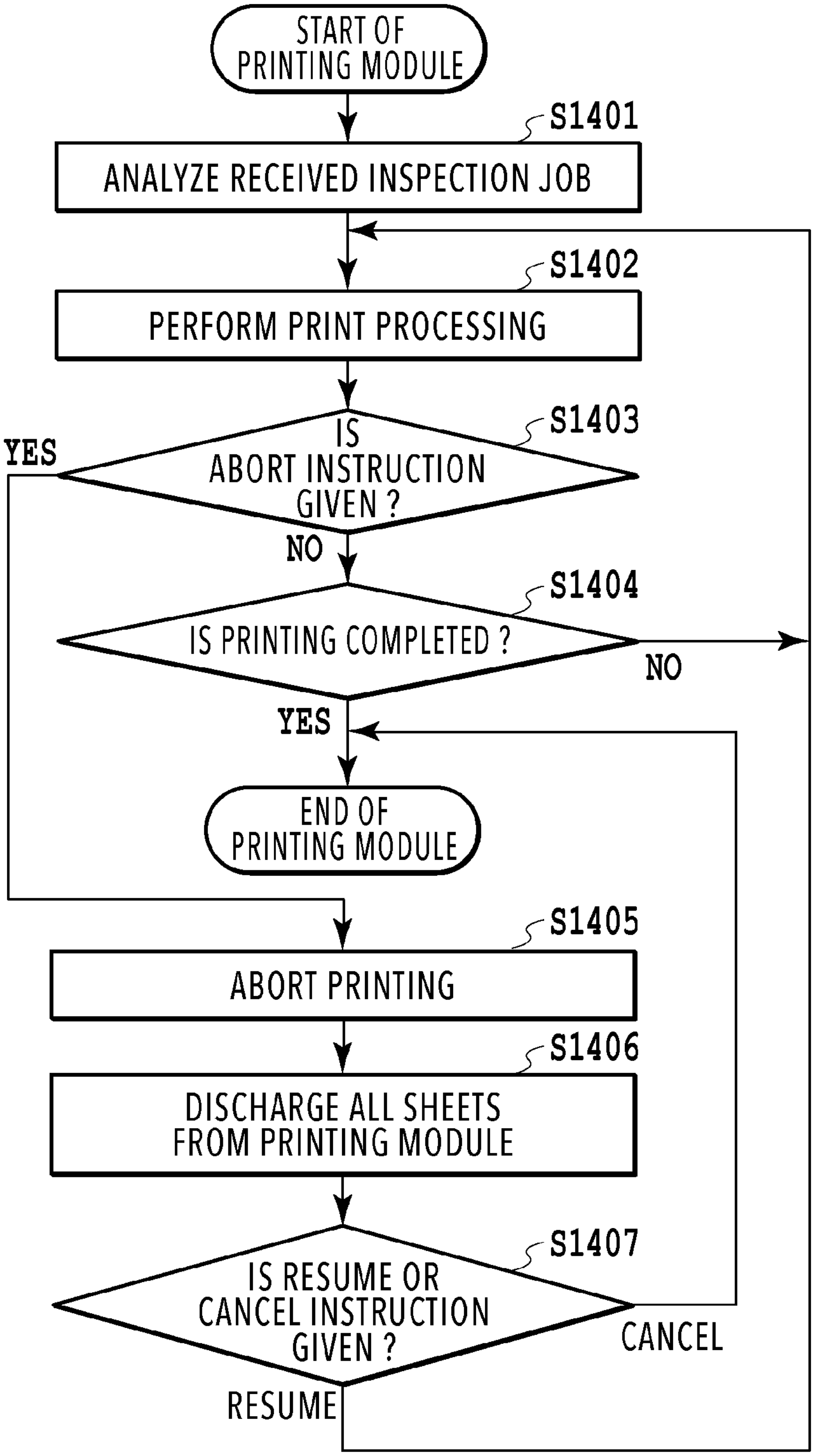
FIG. 14A is a flowchart showing a flow of print processing of a printing module in a first embodiment.
Figure 14B:
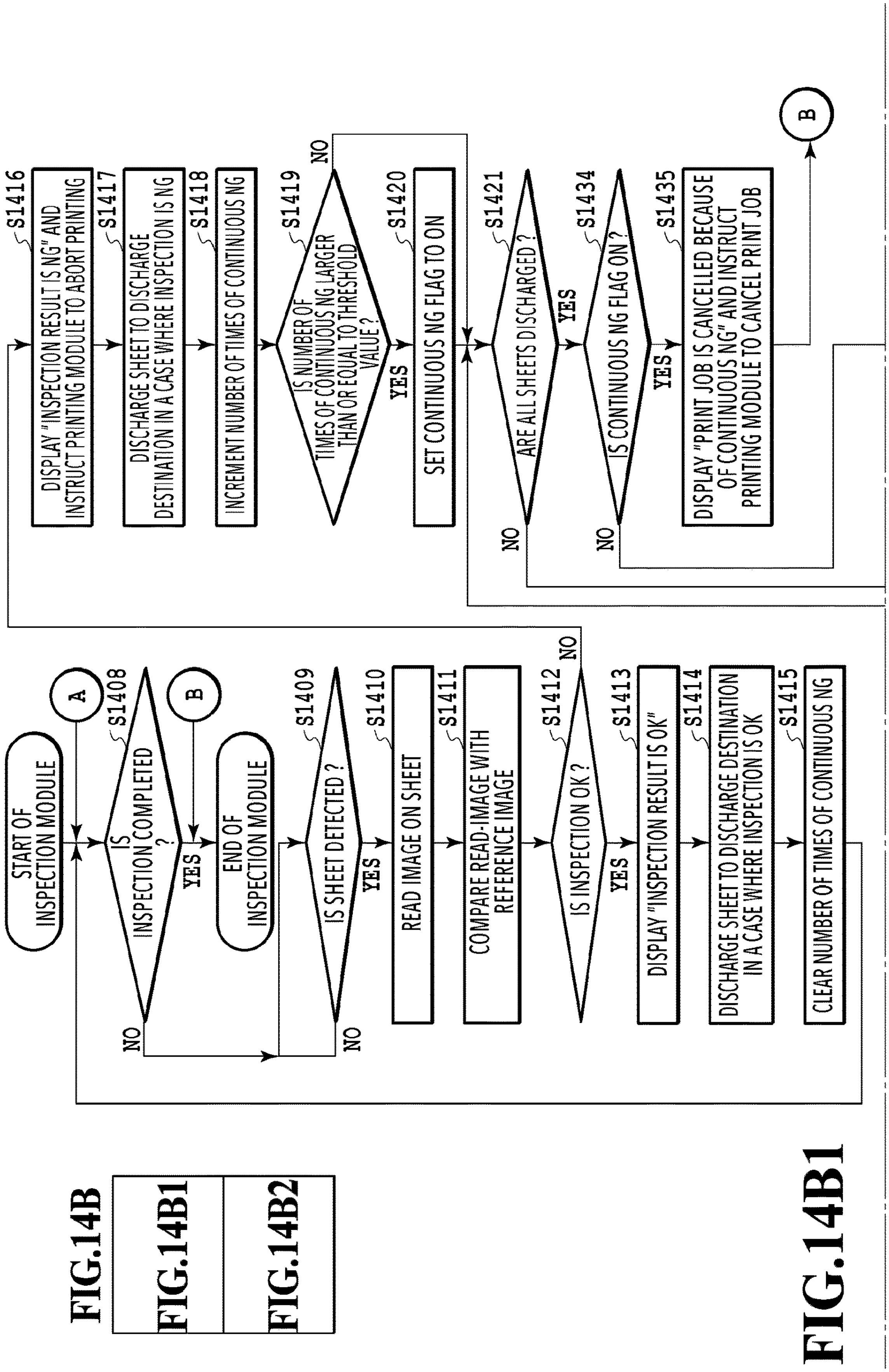
FIG. 14B is a diagram showing the relationship between FIGS. 14B1 and 14B2, and FIGS. 14B1 and 14B2 are flowcharts showing a flow of print processing of an inspection module in the first embodiment.

Next, a flow of specific processing at the time of performing a print job accompanied by inspection is explained. In a case where the user depresses the "Start print" button 1106 within the job setting screen 1100 described above, the external controller 102 generates the print job described above and instructs the image forming apparatus 101 to perform the print job. As described above, in the present embodiment, it is assumed that the "Start inspection" button 406 is depressed on the inspection menu screen 400 of the inspection module 109 before the "Start print" button 1106 within the job setting screen 1100 is depressed. FIG. 14A is a flowchart showing a flow of a series of processing in the printing module 107 in a case where the print job is input. FIGS. 14B1 and 14B2 are flowcharts showing a flow of a series of processing in the inspection module 109 in a case where the print job is input.

<<Processing in Printing Module>>

The series of processing shown in the flowchart in FIG. 14A is started by receiving the print job transmitted from the external controller 102 in the printing module 107 of the image forming apparatus 101. Symbol "S" in the flowcharts in FIG. 14A and FIGS. 14B1 and 14B2 means a step.

Each piece of processing at S1401 to S1407 shown in FIG. 14A is performed in the CPU 222 of the printing module 107. First, at S1401, the print job received from the external controller 102 is analyzed. Then, the CPU 222 of the printing module 107 controls the inserter 108, the inspection module 109, the stacker 110, and the finisher 111 via the communication cable 281 in accordance with the analysis result of the received print job.

Then, at S1402, the print processing for the sheet for which the print processing has not been performed yet (first sheet immediately after processing starts) of the print job is performed. In a case of receiving the instructions to resume printing from the inspection NG sheet from the inspection module 109 at S1407, to be described later, the CPU 222 of the printing module 107 performs printing from the inspection NG sheet.

Subsequently, at S1403, the CPU 222 of the printing module 107 determines whether a notification to abort printing is given from the CPU 238 of the inspection module 109 at S1413, to be described later. In a case where the notification to abort printing is given at S1403, the processing advances to S1405 and in a case where the notification to abort printing is not given, the processing advances to S1404.

At S1404, the CPU 222 of the printing module 107 determines whether or not the print processing designated by the print job is completed is determined. In a case where the print processing is not completed, the processing returns to S1402 and the print processing is continued for the remaining sheet(s). On the other hand, in a case where the print processing is completed, the processing in the printing module 107 finishes.

At S1405, based on the instructions to abort printing from the CPU 238 of the inspection module 109, the print job being printed is aborted.

At S1406, in a case where the abort instructions are given, all the printed sheets of the printed sheets and the fed sheets are discharged.

After that, at S1407, the CPU 222 of the printing module 107 waits for the instructions to resume or cancel from the CPU 238 of the inspection module 109. In a case where a notification of instructions to resume is given from the CPU 238 of the inspection module 109, the processing returns to S1402 and printing is resumed from the sheet determined to be inspection NG. In a case where the notification of the instructions to cancel is given from the CPU 238 of the inspection module 109, the print job is cancelled.

<<Processing in Inspection Module>>

Each piece of processing at S1408 to S1436 shown in FIGS. 14B1 and 14B2 starts in response to depressing the "Start inspection" button 406 in the inspection module 109 and is performed in parallel to the print processing (S1402 to S1407) in the printing module 107.

Figure 15:
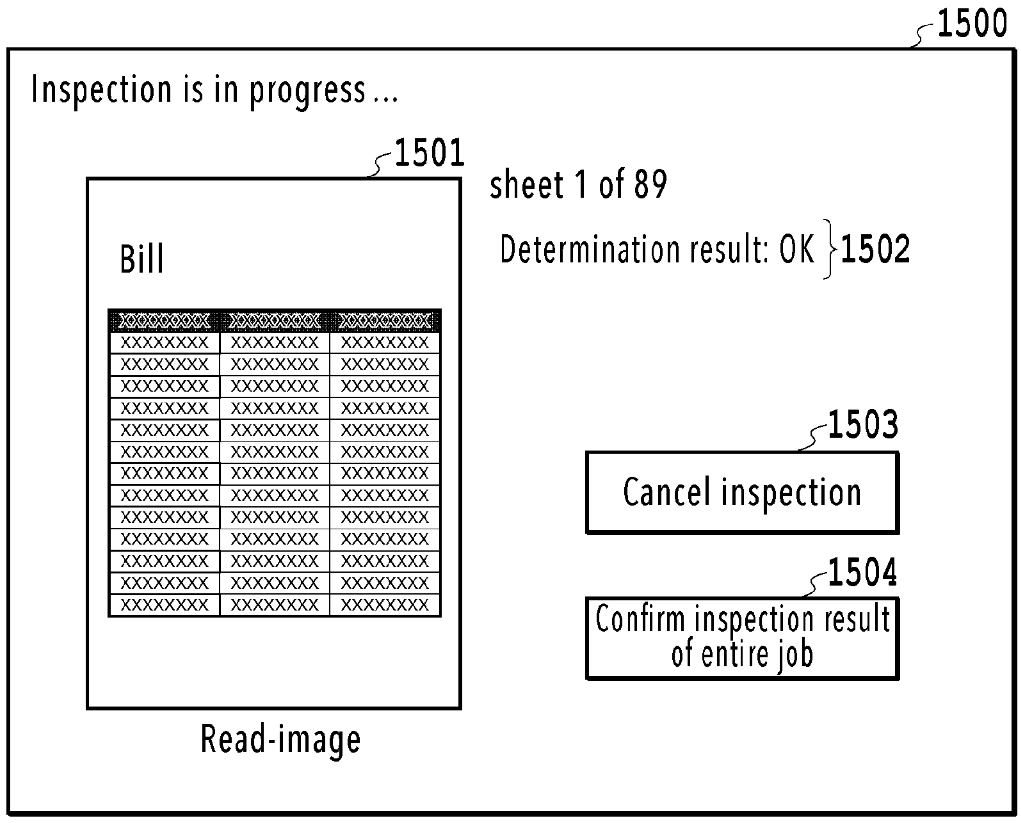
FIG. 15 is a diagram showing an example of an inspection status screen.
Figure 16:
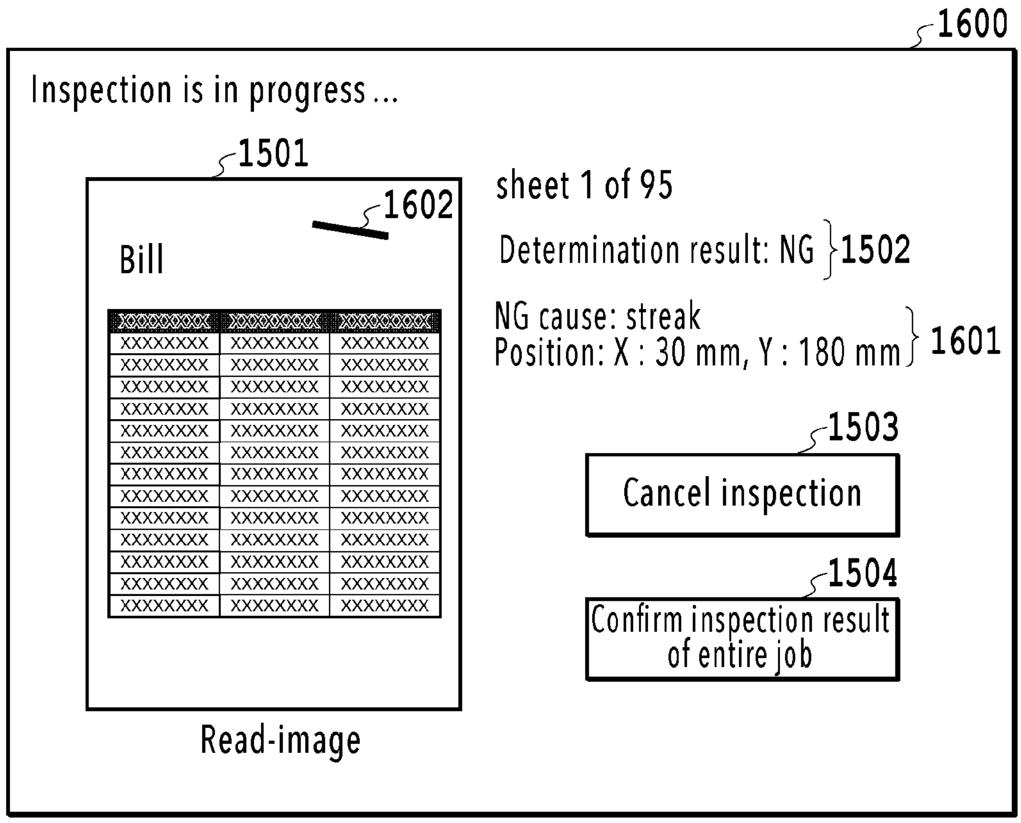
FIG. 16 is a diagram showing an example of the inspection status screen.

First, at S1408, the CPU 238 of the inspection module 109 determines whether or not the inspection completes. For example, in a case where a "Cancel inspection" button 1503 within the UI screen shown in FIG. 15 and FIG. 16, to be described later, is depressed or in a case where the inspection processing for all the number of sheets designated in the print job is completed, the inspection in the inspection module 109 finishes. In a case where the inspection is not finished, the processing advances to next S1409. At S1409, the detection processing of a printed sheet that is conveyed is performed. Then, in a case where a printed sheet is detected, the processing advances to S1410.

At S1410, each of the front side and the back side of the detected printed sheet is read by the first camera 331 and the second camera 332, respectively. The read-image is stored in the memory 239. Further, the read-image is displayed in an image display area 1501 within an inspection status screen 1500 in FIG. 15, which indicates the status of the printed sheet being inspected, and the processing advances to S1411.

At next S1411, the registered reference image and the read-image at S1410 are compared. At S1412, the processing is branched in accordance with whether the read-image of the printed sheet being inspected is determined to be inspection OK or determined to be inspection NG based on the result of the comparison processing using the reference image at S1411.

In a case where the read image of the printed sheet being inspection is determined to be inspection OK at S1412, the processing advances to S1413. At S1413, a character string of "OK" indicating that there is no problem in the inspection result is displayed in a result display area 1502 within the inspection status screen 1500 in FIG. 15. It may also be possible to display the inspection result automatically, or it may also be possible to display the inspection result only in a case where a "Confirm inspection result" button 406 within the inspection menu screen 400 shown in FIG. 4 described above is depressed. It is possible to cancel the inspection by depressing the button 1503 within the inspection status screen 1500. In a case where the button 1503 is depressed, the inspection module 109 cancels the inspection processing and the UI screen of the display unit 241 makes a transition into the inspection menu screen 400 in FIG. 4. At this time, it may also be possible to give the instructions to abort printing to the printing module 107 as at S1416, to be described later. Further, it is possible to cause the UI screen of the display unit 241 to make a transition into the inspection result confirmation screen 1000 in FIG. 10, on which it is possible to confirm the inspection result of the entire print job, by depressing a button 1504 within the inspection status screen 1500. After displaying the inspection result, the processing advances to S1414. At S1414, the CPU 238 of the inspection module 109 instructs the CPU 245 of the stacker 110 to discharge the printed sheet being inspected onto the stack tray 341 within the stacker 110, which is the discharge destination designated in the print job in a case of inspection OK. In accordance with the instructions from the CPU 238 of the inspection module 109, the printed sheet determined to be inspection OK is conveyed from the inspection module 109 to the stacker 110. Based on the control of the CPU 245 of the stacker 110, the conveyed printed sheet is discharged onto the stack tray 341 within the stacker 110, which is the discharge destination designated in a case of inspection OK, and the processing advances to S1415. Next, at S1415, the CPU 238 of the inspection module 109 clears the value of the number of times of continuous NG stored in the memory 239 to "0". After that, the processing returns to S1408 and the inspection processing is continued.

In a case where the read-image of the printed sheet being inspected is determined to be inspection NG at S1412, the processing advances to S1416. At S1416, a character string of "NG" indicating that there is a problem in the inspection result is displayed in the result display area 1502 within an inspection status screen 1600 in FIG. 16. Further, in the example in FIG. 16, in addition of the display of the character string "NG", an information display area 1601 indicating information specifying the cause (in this example, "streak") by which the read-image is determined to be a defective image and a result display area 1602 indicating the position of the cause are displayed. Further, at S1416, the inspection module 109 notifies the printing module 107 to abort printing via the communication cable 281. After the inspection module 109 displays the inspection result and notifies the printing module 107 to abort printing, the processing advances to S1417.

At S1417, the CPU 238 of the inspection module 109 instructs the CPU 245 of the stacker 110 to discharge the printed sheet being inspected onto the escape tray 346 of the stacker 110, which is the discharge destination designated as the discharge destination in a case of inspection NG. In accordance with the instructions from the CPU 238 of the inspection module 109, the printed sheet determined to be inspection NG is conveyed from the inspection module 109 to the stacker 110. Based on the control of the CPU 245 of the stacker 110, the conveyed printed sheet is discharged onto the escape tray 346 of the stacker 110, which is the discharge destination designated in a case of inspection NG and the processing advances to S1418.

Next, at S1418, the CPU 238 of the inspection module 109 increments the number of times of continuous NG and stores it in the memory 239, and advances the processing to S1419.

At S1419, the CPU 238 of the inspection module 109 determines whether the number of times of continuous NG is larger than or equal to a threshold value that is set in the setting area 903 for setting "Number of sheets for determining continuous NG", within the inspection condition setting screen 900 in FIG. 9. In a case where the number of times of continuous NG is larger than or equal to the threshold value of "Number of sheets for determining continuous NG", the CPU 238 of the inspection module 109 advances the processing to S1420. At S1420, the CPU 238 of the inspection module 109 sets the value of a continuous NG flag stored in the memory 239 to "1" indicating "ON" and advances the processing to S1421. At S1419, in a case where the number of times of continuous NG is less than the threshold value of "Number of sheets for determining continuous NG", the CPU 238 of the inspection module 109 leaves the value of the continuous NG flag "0" indicating "OFF" and advances the processing to S1421.

At S1421, the CPU 238 of the inspection module 109 determines whether all the sheets existing in the printing module 107 and the inspection module 109 are discharged at the time of the occurrence of inspection NG. A specific determination method is as follows. In the print job, the CPU 222 of the printing module 107 has counted the number of fed sheets by the time of the occurrence of inspection NG. Information on the number of fed sheets is transmitted from the CPU 222 of the printing module 107 to the CPU 238 of the inspection module 109. Further, the CPU 238 of the inspection module 109 has counted the number of sheets discharged onto the stack tray 341 within the stacker 110 and the number of sheets discharged onto the escape tray 346 of the stacker 110, respectively. The CPU 238 of the inspection module 109 determines that all the sheets are discharged in a case where the sum of the number of sheets discharged onto the stack tray 341 and the number of sheets discharged onto the escape tray 346 matches the number of fed sheets.

Consequently, at S1421, in a case of determining that the sum of the number of sheets discharged onto the stack tray 341 and the number of sheets discharged onto the escape tray 346 matches the number of fed sheets, the CPU 238 of the inspection module 109 advances the processing to S1434. In a case of determining that the sum of the number of sheets discharged onto the stack tray 341 and the number of sheets discharged onto the escape tray 346 does not match the number of fed sheets, the CPU 238 of the inspection module 109 advances the processing to S1422.

At S1422, the detection processing of the printed sheet that is conveyed to the inspection module 109 is performed. Then, in a case where the printed sheet is detected in the inspection module 109, the processing advances to S1423. In a case where the printed sheet is not detected in the inspection module 109, the processing returns to S1421. The reason the processing is returned to S1421 is that a case is taken into consideration where the sum of the number of sheets discharged onto the stack tray 341 and the number of sheets discharged onto the escape tray 346 matches the number of fed sheets during the processing at S1422.

At S1423, each of the front side and the back side of the detected printed sheet is read by the first camera 331 and the second camera 332 and the processing advances to S1424.

At S1424, the CPU 238 of the inspection module 109 determines whether the conveyed printed sheet is a blank sheet. In a case where the conveyed printed sheet is a blank sheet, the CPU 238 of the inspection module 109 advances the processing to S1433 without performing inspection. At S1433, the CPU 238 of the inspection module 109 instructs the CPU 245 of the stacker 110 to discharge the blank sheet onto the escape tray 346 of the stacker 110, which is the discharge destination designated as the discharge destination in a case of inspection NG. In accordance with the instructions from the CPU 238 of the inspection module 109, the blank sheet is conveyed from the inspection module 109 to the stacker 110. Based on the control of the CPU 245 of the stacker 110, the conveyed blank sheet is discharged onto the escape tray 346 of the stacker 110, which is the discharge destination designated in a case of inspection NG and the processing is returned to S1421. The reason is that the blank sheet for which printing is not performed is the sheet in which no printing defect occurs, and therefore, continuous NG is prevented from occurring meaninglessly. In a case where the conveyed printed sheet is not a blank sheet, the processing advances to S1425.

At S1425, the registered reference image and the read-image read at S1423 are compared and the processing advances to S1426. At S1426, the processing is branched in accordance with whether the read-image of the printed sheet being inspected is inspection OK or inspection NG based on the result of the comparison processing using the reference image at S1425.

At S1426, in a case where the read image of the printed sheet being inspected is determined to be inspection OK, the processing advances to S1427. At S1427, a character string of "OK" indicating that there is no problem in the inspection result is displayed in the result display area 1502 within the inspection status screen 1500 and the processing advances to S1428. At S1428, the CPU 238 of the inspection module 109 clears the value of the number of times of continuous NG stored in the memory 239 to "0". After that, the processing advances to S1433. At S1433, the CPU 238 of the inspection module 109 instructs the CPU 245 of the stacker 110 to discharge the printed sheet being inspected onto the escape tray 346 of the stacker 110, which is the discharge destination designated as the discharge destination in a case of inspection NG. In accordance with the instructions from the CPU 238 of the inspection module 109, the printed sheet is conveyed from the inspection module 109 to the stacker 110. Based on the control of the CPU 245 of the stacker 110, the conveyed printed sheet is discharged onto the escape tray 346 of the stacker 110, which is the discharge destination designated in a case of inspection NG and the processing returns to S1421.

At S1426, in a case where the read-image of the printed sheet being inspected is determined to be inspection NG, the processing advances to S1429. At S1429, a character string of "NG" indicating that there is a problem in the inspection result is displayed in the result display area 1502 within the inspection status screen 1600 in FIG. 16 and the processing advances to S1430.

At S1430, the CPU 238 of the inspection module 109 increments the number of times of continuous NG and stores it in the memory 239, and advances the processing to S1431.

At S1431, the CPU 238 of the inspection module 109 determines whether the number of times of continuous NG is larger than or equal to a threshold value that is set in the setting area 903 for setting "Number of sheets for determining continuous NG", within the inspection condition setting screen 900 in FIG. 9. In a case where the number of times of continuous NG is larger than or equal to the threshold value of "Number of sheets for determining continuous NG", the CPU 238 of the inspection module 109 advances the processing to S1432. At S1432, the CPU 238 of the inspection module 109 sets the value of a continuous NG flag stored in the memory 239 to "1" indicating "ON" and advances the processing to S1433.

At S1431, in a case where the number of times of continuous NG is less than the threshold value of "Number of sheets for determining continuous NG", the CPU 238 of the inspection module 109 leaves the value of the continuous NG flag stored in the memory 239 "0" indicating "OFF" and advances the processing to S1433.

At S1433, the CPU 238 of the inspection module 109 instructs the CPU 245 of the stacker 110 to discharge the printed sheet being inspected onto the escape tray 346 of the stacker 110, which is the discharge destination designated as the discharge destination in a case of inspection NG. In accordance with the instructions from the CPU 238 of the inspection module 109, the printed sheet is conveyed from the inspection module 109 to the stacker 110. Based on the control of the CPU 245 of the stacker 110, the conveyed printed sheet is discharged onto the escape tray 346 of the stacker 110, which is the discharge destination designated in a case of inspection NG, and the processing returns to S1421. At S1421, in a case of determining that the sum of the number of sheets discharged onto the stack tray 341 and the number of sheets discharged onto the escape tray 346 matches the number of fed sheets, the CPU 238 of the inspection module 109 advances the processing to S1434.

At S1434, the CPU 238 of the inspection module 109 determines whether the continuous NG flag is "1" indicating "ON". In a case where the value of the continuous NG flag is "1" indicating "ON", the processing advances to S1435 and in a case where the continuous NG flag is "0" indicating "OFF", the processing advances to S1436.

Figure 17:
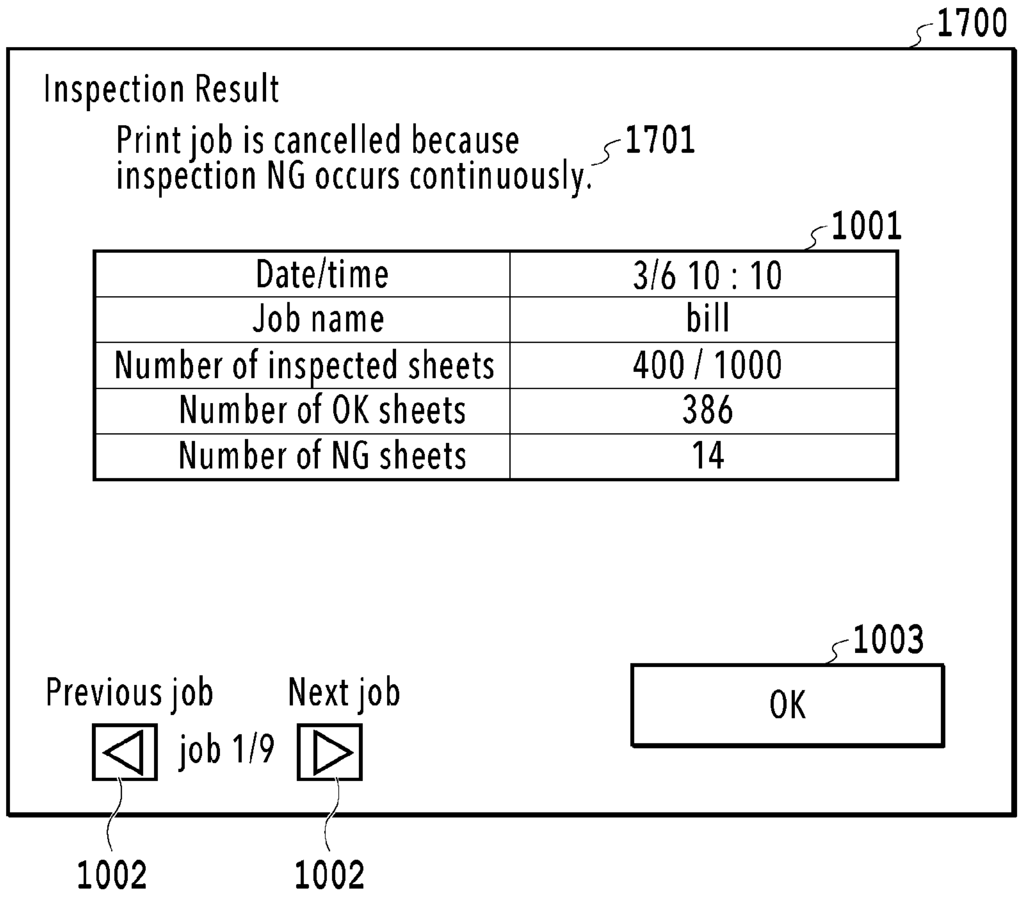
FIG. 17 is a diagram showing an example of an inspection result confirmation screen.

At S1435, a character string indicating that the print job is cancelled because continuous NG occurs is displayed in a cancel cause display area 1701 within an inspection result confirmation screen 1700 in FIG. 17. Further, the CPU 238 of the inspection module 109 notifies the printing module

107 to cancel the print job because of continuous NG via the communication cable 281 and terminates the inspection processing.

Figure 18:
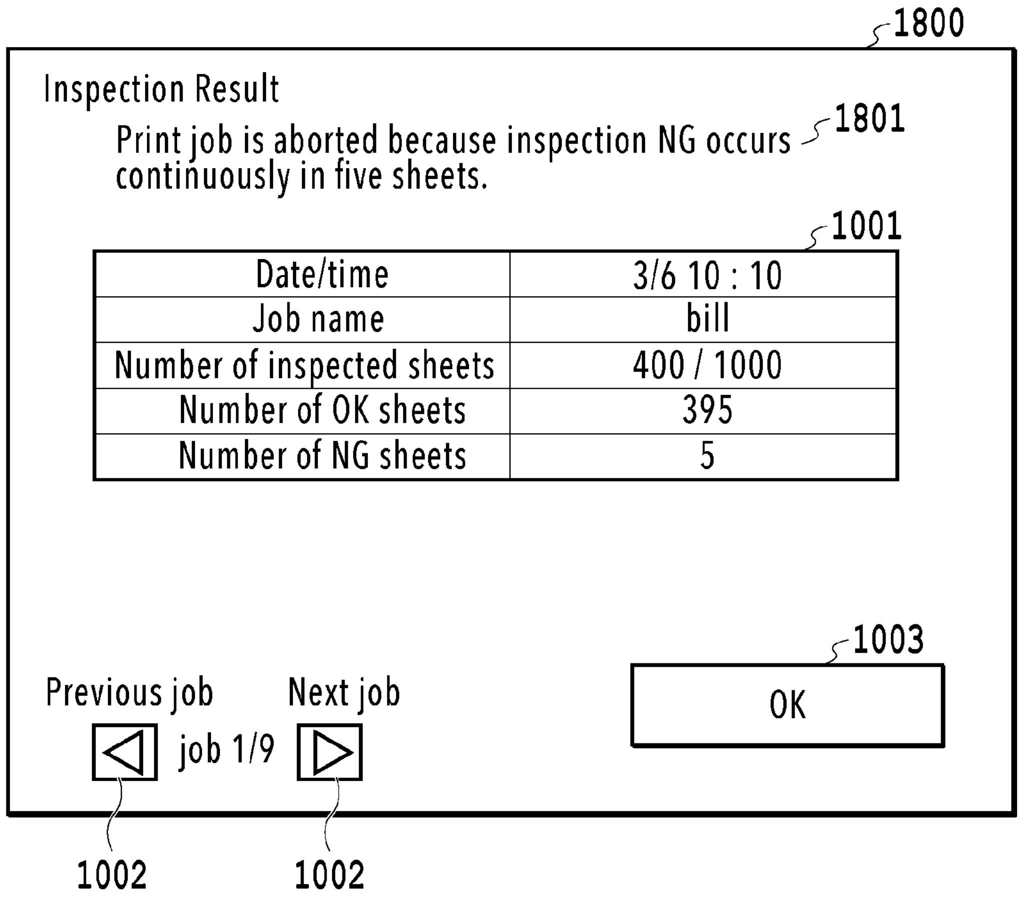
FIG. 18 is a diagram showing an example of the inspection result confirmation screen.

At S1436, the CPU 238 of the inspection module 109 displays a character string indicating that the print job is aborted because of the occurrence of continuous NG in an abort cause display area 1801 within an inspection result confirmation screen 1800 in FIG. 18. After that, the CPU 238 of the inspection module 109 makes it possible to resume printing from the sheet determined first to be inspection NG and returns the processing to S1408. Further, the CPU 238 of the inspection module 109 notifies the printing module 107 to resume printing from the sheet determined first to be inspection NG via the communication cable 281.

The above is the print job processing contents in the image forming apparatus 101 of the present embodiment. As described above, according to the present embodiment, in a case where inspection NG occurs, the inspection module 109 performs inspection even for the subsequent printed sheet and determines whether the printed sheet is inspection OK or inspection NG. In a case where NG occurs continuously in this inspection, it is possible for the user to notice the stain at the reading unit of the inspection module 109, the input of the print job, which is not corresponding to the set reference image, or the like in an early stage. Due to this, it is possible to reduce the number of wasted sheets that occur by the printed sheet that should be originally determined to be normal being determined erroneously to have a printing defect.

First Modification Example

In the first embodiment described above, in a case where the value of the continuous NG flag is "1" indicating "ON" at S1435 of the flowchart in FIG. 14, the print job is cancelled. It may also be possible to provide a UI that causes the user to select resume or cancel by temporarily aborting the print job instead of forcibly canceling the print job. Specifically, it may be possible to provide a selection area in which a "Resume" button and a "Cancel" button are arranged instead of the OK button 1003 within the inspection result confirmation screen 1700 in FIG. 17. For example, in a case where continuous NG occurs because of stain of the first camera 331 or the second camera 332, it is possible to immediately resume the print job in a case where the user depresses the "Resume" button after the user removes the stain.

Second Modification Example

Figure 19A:
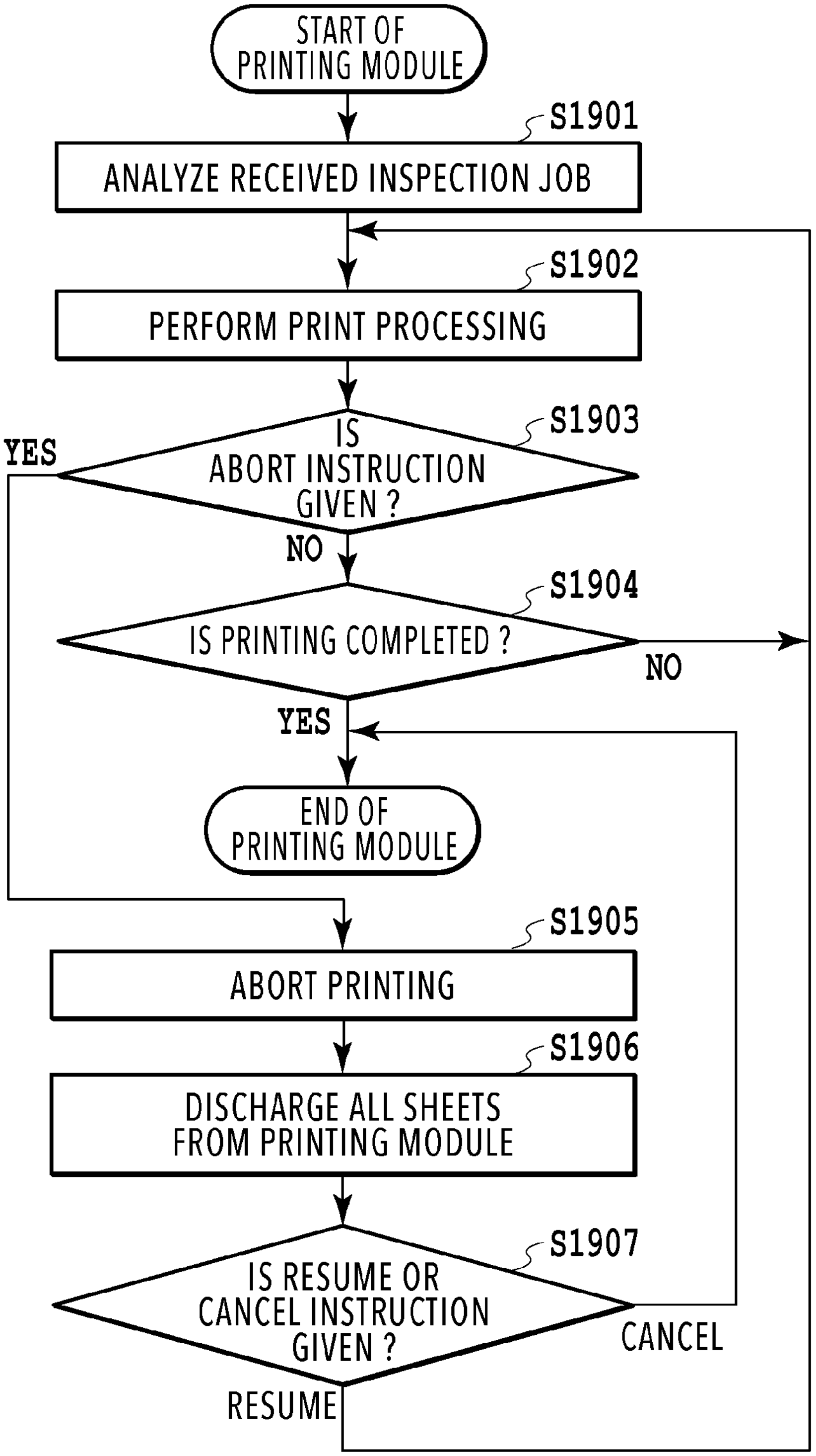
FIG. 19A is a flowchart showing a flow of print processing of a printing module in a second modification example.
Figure 19B:
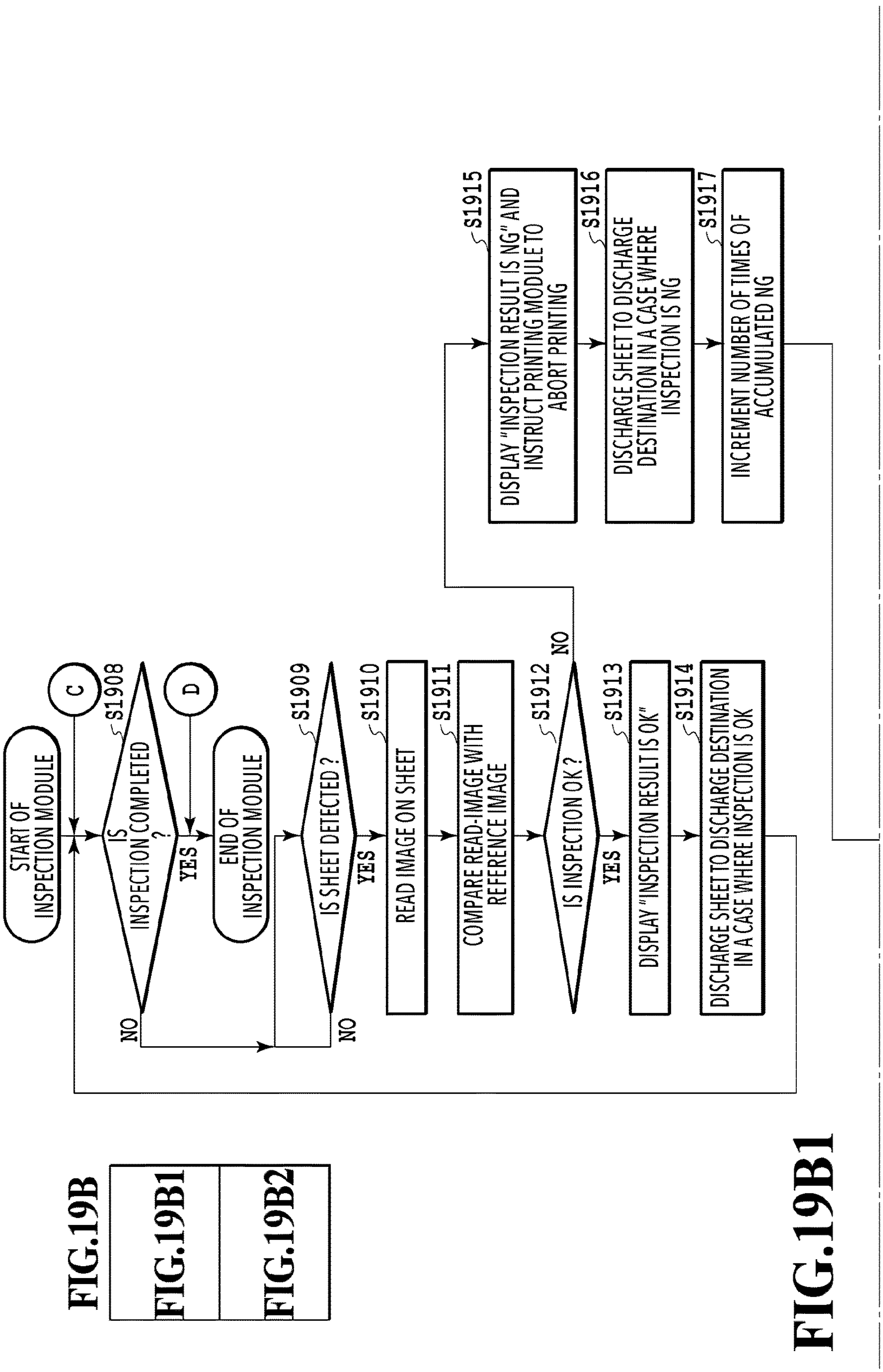
FIG. 19B is a diagram showing the relationship between FIGS. 19B1 and 19B2, and FIGS. 19B1 and 19B2 are flowcharts showing a flow of print processing of an inspection module in the second modification example.

Further, in the first embodiment described above, the number of times of continuous NG is set in the setting area 903 in FIG. 9 and at S1419 or S1431, the CPU 238 of the inspection module 109 determines whether the number of times of continuous NG is larger than or equal to the threshold value. Instead of determining the cancel of the print job by using the number of times of continuous NG, it may also be possible to perform the determination of the cancel by determining whether the accumulated number of times in which the inspection result is inspection NG is larger than or equal to a threshold value or whether the percentage that the inspection result is inspection NG is larger than or equal to a threshold value. Specific flowcharts are shown in FIG. 19A and FIGS. 19B1 and 19B2. In the following, the main points of the flowcharts in FIGS. 19B1 and 19B2 are described.

In the flowcharts in FIGS. 19B1 and 19B2, in a case where inspection NG occurs in the inspection at S1912 or S1923, by incrementing the number of times of accumulated NG in the processing at S1917 or S1926 and storing it in the memory 239, the number of times of accumulated NG is obtained.

In a case where all the printed sheets are discharged at S1918, the processing advances to S1928. At S1928, the CPU 238 of the inspection module 109 determines whether the number of times of accumulated NG is larger than or equal to a threshold value that is set in advance.

In a case where the number of times of accumulated NG is larger than or equal to the threshold value, the processing advances to S1929 and the CPU 238 of the inspection module 109 cancels the print job.

In a case where the number of times of accumulated NG is less than the threshold value, the processing advances to S1930. At S1930, the CPU 238 of the inspection module 109 determines whether the percentage in which the inspection result is inspection NG is larger than or equal to a threshold value. In a case where the percentage in which the inspection result is inspection NG is larger than or equal to the threshold value, the processing advance to S1929 and the CPU 238 of the inspection module 109 cancels the print job. In a case where the percentage in which the inspection result is inspection NG is less than the threshold value, the processing advances to S1931.

At S1929, the CPU 238 of the inspection module 109 displays a character string, such as "The print job is cancelled because inspection NG occurs accumulatively." or "The print job is cancelled because the percentage in which inspection NG occurs reaches the set percentage.", in the cancel cause display area 1701 in FIG. 17. After that, the CPU 238 of the inspection module 109 notifies the printing module 107 to cancel the print job via the communication cable 281 and terminates the inspection processing.

At S1931, the CPU 238 of the inspection module 109 displays a character string, which indicates "The print job is aborted because inspection NG occurs accumulatively." in the abort cause display area 1801 within the inspection result confirmation screen 1800 in FIG. 18. After that, the CPU 238 of the inspection module 109 makes it possible to resume printing from the sheet determined first to be inspection NG and returns the processing to S1908. Further, the CPU 238 of the inspection module 109 notifies the printing module 107 to resume printing from the sheet determined first to be inspection NG via the communication cable 281 and resumes the print job.

The following example is considered as the specific example of the percentage in which the inspection result is inspection NG is larger than or equal to a threshold value. That is, the percentage is obtained by taking the number of sheets discharged to the discharge destination at the time of inspection NG after the printed sheet determined first to be inspection NG as a denominator and the number of times of accumulated NG as a numerator and dividing the numerator by the denominator. In a case where the above percentage is larger than or equal to a threshold value, the CPU 238 of the inspection module 109 determines that the error is occurred. Further, the display of the setting area 903 in FIG. 9 is changed to "Number of sheets for determining accumulated NG", "Percentage for determining NG" or the like to enable the user to set a desired value.

In a case where the number of times of accumulated NG becomes larger than or equal to the threshold value or in a case where the percentage in which the inspection result is inspection NG becomes larger than or equal to the threshold value, in the flowcharts in FIG. 19A and FIGS. 19B1 and 19B2, the print job is cancelled. Even in the second modification example also, as in the first modification example, it may also be possible to provide a UI that causes the user to select resume or cancel by temporarily aborting the print job. In a case where erroneous detection of a printing defect occurs a very small number of times because of attaching a minute stain to some module in the printing system, providing such a UI enables the user to immediately resume the print job by depressing the "Resume" button after removing the stain.

As above, according to the second modification example, it is possible to cancel the print job even in a case where the accumulated number of times in which the inspection result is inspection NG becomes larger than or equal to the threshold value or the percentage in which the inspection result is inspection NG becomes larger than or equal to the predetermined percentage. Due to this, in a case where the erroneous detection of the printing defect occurs a very small number of times because of attaching a minute stain to a camera, a sensor or the like in some module of the printing system, it is possible for the user to recognize the stain or the like in an early stage.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-066106, filed Apr. 13, 2022, which is hereby incorporated by reference wherein in its entirety.

What is claimed is:

1. A printing system comprising:

a printing unit configured to perform print processing based on image data designated in a print job;

an inspection unit configured to perform an inspection of whether a printed sheet for which the print processing has been performed corresponds to a reference image for the inspection;

a discharge unit configured to discharge the printed sheet, which corresponds to the reference image for the inspection, to a first discharge destination and discharge the printed sheet, which does not correspond to the reference image for the inspection, to a second discharge destination;

one or more memories that store instructions; and one or more processors that execute the instructions to:

cause the inspection unit to inspect a subsequent printed sheet, which is conveyed from the printing unit, subsequent to the printed sheet, which does not correspond to the reference image for the inspection;

cause the discharge unit to discharge the subsequent printed sheet inspected by the inspection unit to the second discharge destination even in a case where an inspection result of the subsequent printed sheet indicates that the subsequent printed sheet corresponds to the reference image for the inspection;

instruct the printing unit to abort the print processing relating to the print job in a case where it is detected that the inspected printed sheet does not correspond to the reference image for the inspection; and determine whether to resume or cancel the aborted print job in accordance with a predetermined condition relating to the inspection.

2. The printing system according to claim 1, wherein the predetermined condition is that a number of times in which it is continuously detected that the inspected printed sheet does not correspond to the reference image for the inspection is larger than or equal to a threshold value.

3. The printing system according to claim 1, wherein the predetermined condition is that an accumulated number of times in which it is detected that the inspected printed sheet does not correspond to the reference image for the inspection is larger than or equal to a threshold value.

4. The printing system according to claim 1, wherein the predetermined condition is that a value obtained by dividing a number of printed sheets in which it is detected that the inspected printed sheet does not correspond to the reference image for the inspection by a number of printed sheets discharged to a second discharge destination, including the printed sheet in which it is detected that the inspected printed sheet does not correspond to the reference image for the inspection, and subsequent printed sheets, is larger than or equal to a threshold value.

5. The printing system according to claim 1, further comprising:

a user interface unit having a setting screen for a user to set the predetermined condition and a confirmation screen for showing a result of the inspection to the user.

6. The printing system according to claim 5, wherein in a case where the predetermined condition is satisfied, a selection area, which causes the user to select to resume or cancel the print job before cancelling the print job, is displayed on the confirmation screen.

7. The printing system according to claim 6, wherein the or more processors further execute the instructions to:

resume the print job in a case where instructions to resume the print job are given by the user input from the user interface unit to the selection area displayed on the confirmation screen; and cancel the print job in a case where instructions to cancel the print job are given by the user input from the user interface unit to the selection area displayed on the confirmation screen.

8. A control method for a printing system, comprising:

performing print processing based on image data designated in a print job;

performing an inspection of whether a printed sheet for which the print processing has been performed corresponds to a reference image for the inspection;

discharging the printed sheet, which corresponds to the reference image for the inspection, to a first discharge destination and discharging the printed sheet, which does not correspond to the reference image for the inspection, to a second discharge destination;

performing the inspection for a subsequent printed sheet subsequent to the printed sheet that does not correspond to the reference image for the inspection;

discharging the subsequent printed sheet for which the inspection has been performed to the second discharge destination even in a case where an inspection result of the subsequent printed sheet indicates that the subsequent printed sheet corresponds to the reference image for the inspection;

aborting the print processing relating to the print job in a case where it is detected that the inspected printed sheet does not correspond to the reference image for the inspection; and determining whether to resume or cancel the aborted print job in accordance with a predetermined condition relating to the inspection.

9. A non-transitory computer readable storage medium storing a program for causing a computer to perform a control method for a printing system, the control method comprising:

performing print processing based on image data designated in a print job;

performing an inspection of whether a printed sheet for which the print processing has been performed corresponds to a reference image for the inspection;

discharging the printed sheet, which corresponds to the reference image for the inspection, to a first discharge destination and discharging the printed sheet, which does not correspond to the reference image for the inspection, to a second discharge destination;

performing the inspection for a subsequent printed sheet subsequent to the printed sheet that does not correspond to the reference image for the inspection;

discharging the subsequent printed sheet for which the inspection has been performed to the second discharge destination even in a case where an inspection result of the subsequent printed sheet indicates that the subsequent printed sheet corresponds to the reference image for the inspection;

aborting the print processing relating to the print job in a case where it is detected that the inspected printed sheet does not correspond to the reference image for the inspection; and determining whether to resume or cancel the aborted print job in accordance with a predetermined condition relating to the inspection.

10. The printing system according to claim 1, wherein the printed sheet, which corresponds to the reference image, is a printed sheet in which the inspection is passed; and the printed sheet, which does not correspond to the reference image, is a printed sheet in which the inspection is not passed.

* * * * *